United States Patent
Jinzaki

(10) Patent No.: US 6,742,107 B2
(45) Date of Patent: May 25, 2004

(54) DYNAMICALLY CONFIGURED PROCESSING OF COMPOSITE STREAM INPUT DATA USING NEXT CONVERSION DETERMINING STATE TRANSITION TABLE SEARCHED BY CONVERTED INPUT DATA

(75) Inventor: Akira Jinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 569 days.

(21) Appl. No.: 09/782,285

(22) Filed: Feb. 14, 2001

(65) Prior Publication Data

US 2001/0014936 A1 Aug. 16, 2001

(30) Foreign Application Priority Data

Feb. 15, 2000 (JP) ........................................ 2000-036874

(51) Int. Cl.[7] .............................................. G06F 15/82
(52) U.S. Cl. ........................ 712/200; 712/201; 712/211; 712/248
(58) Field of Search ................................. 712/201, 211, 712/243, 200, 248

(56) References Cited

U.S. PATENT DOCUMENTS

| | | | |
|---|---|---|---|
| 4,984,192 A | | 1/1991 | Flynn .......................... 711/104 |
| 5,459,841 A | * | 10/1995 | Flora-Holmquist et al. ... 326/37 |
| 5,995,963 A | | 11/1999 | Nanba et al. ................... 707/6 |
| 6,131,151 A | | 10/2000 | Graef .......................... 711/173 |
| 6,442,672 B1 | * | 8/2002 | Ganapathy ................... 712/201 |
| 2003/0191792 A1 | * | 10/2003 | Waki et al. .................. 709/100 |

FOREIGN PATENT DOCUMENTS

JP          08305554          11/1996

* cited by examiner

Primary Examiner—Kenneth S. Kim
(74) Attorney, Agent, or Firm—Staas & Halsey LLP

(57) ABSTRACT

A table storing a state transition rule is arranged in a memory. By referencing the table based on input data, the process to be performed for the input data is determined and executed. Additionally, a process capability can be changed by altering a setting in this table. As a result, a data processing device that can perform the processes for general-purpose data, such as a stream data process, etc., at high speed, and can flexibly change a capability according to the circumstances.

39 Claims, 37 Drawing Sheets

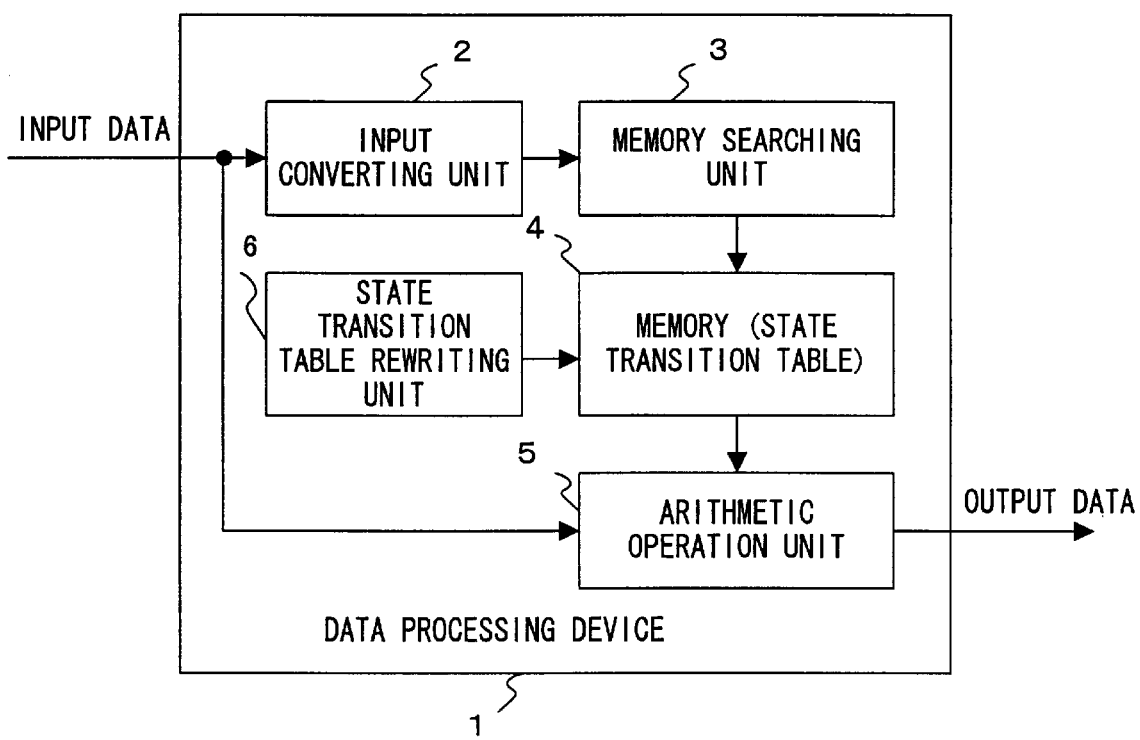
F I G. 2

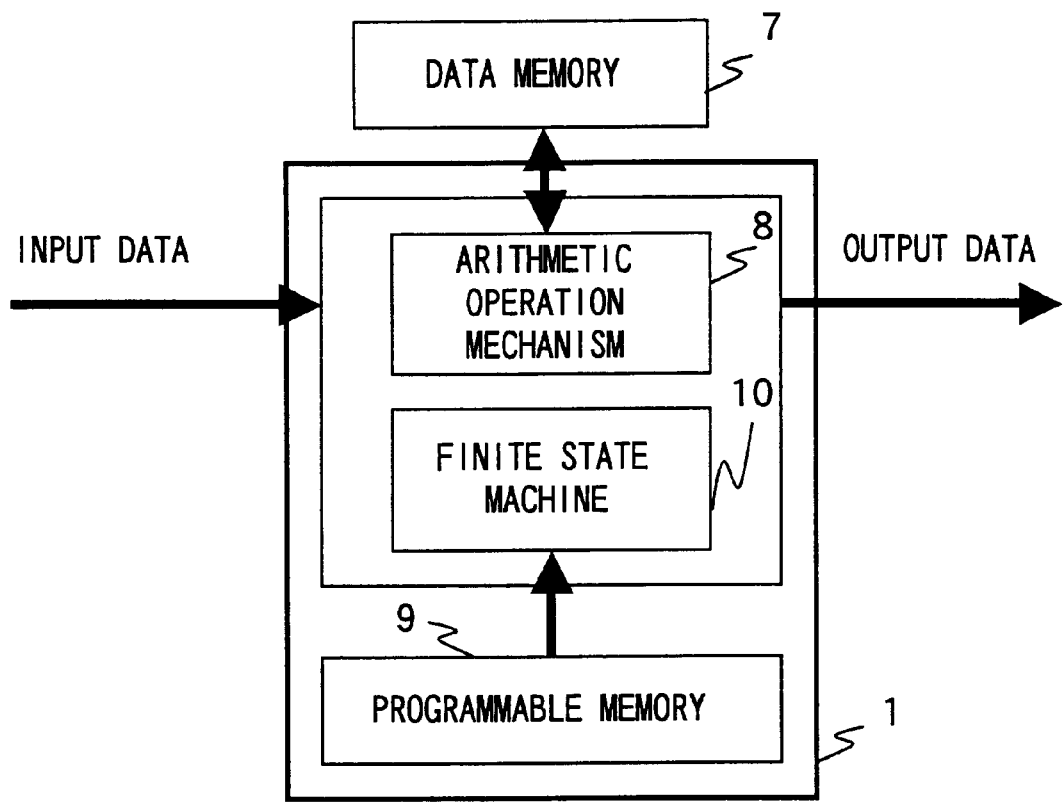
F I G. 3

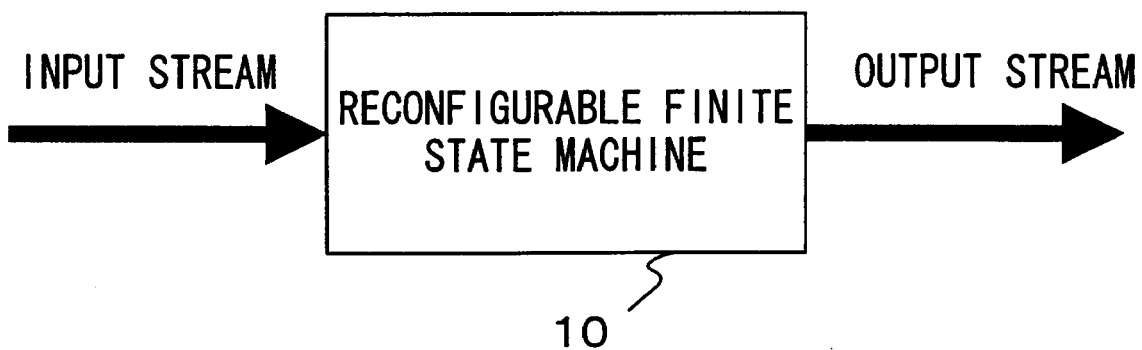
F I G. 5

| | CYCLE n | | CYCLE n+1 | |
|---|---|---|---|---|
| INPUT | INPUT SETTLEMENT/ INPUT CONVERSION | INPUT OPERATION START | INPUT SETTLEMENT/ INPUT CONVERSION | INPUT OPERATION START |
| STATE TRANSITION | STATE TRANSITION START | NEXT STATE SETTLEMENT | STATE TRANSITION START | NEXT STATE SETTLEMENT |
| PROCESS | (SUSPENSION) | PROCESS START / PROCESS COMPLETION | (SUSPENSION) | PROCESS START / PROCESS COMPLETION |
| OUTPUT | (PRECEDING CYCLE OUTPUT) | OUTPUT SETTLEMENT | | OUTPUT SETTLEMENT |
| CLOCK | | | | |

FIG. 6

| INPUT | INPUT SETTLEMENT/INPUT CONVERSION | | INPUT OPERATION START | |
|---|---|---|---|---|
| STATE TRANSITION | STATE TRANSITION START | NEXT STATE SETTLEMENT | | |
| PROCESS | (SUSPENSION) | PROCESS START | PROCESS COMPLETION | |
| OUTPUT | (PRECEDING CYCLE OUTPUT) | | OUTPUT SETTLEMENT | |
| CLOCK | CYCLE n | | CYCLE n+1 | |

F I G. 7

| INPUT DATA | bit7 | bit6 | bit5 | bit4 | bit3 | bit2 | bit1 | bit0 |
|---|---|---|---|---|---|---|---|---|
| MAG PATTERN | 1 | 0 | 0 | 1 | 1 | 0 | 1 | 0 |
| PROCESS RESULT | 0 | 0 | 0 | 0 | bit7 | bit4 | bit3 | bit1 |

FIG. 10

| TAG | INPUT | STATE TRANSITION (FIRST ADDRESS OF STATE TRANSITION TABLE) | CONTROL WORD | OUTPUT |
|---|---|---|---|---|
| | | | | |
| | | | | |

FIG. 11

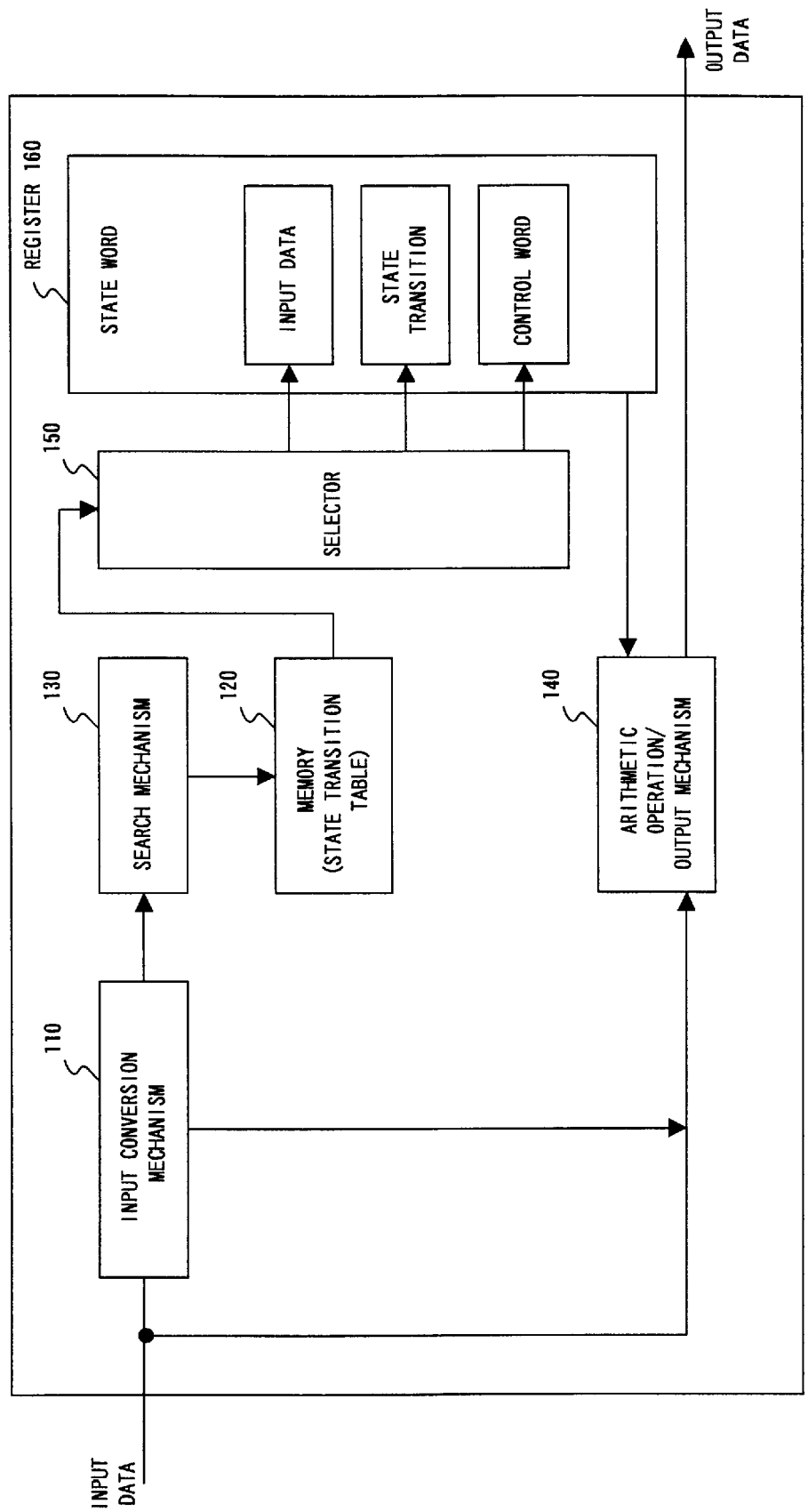
F I G. 1 2

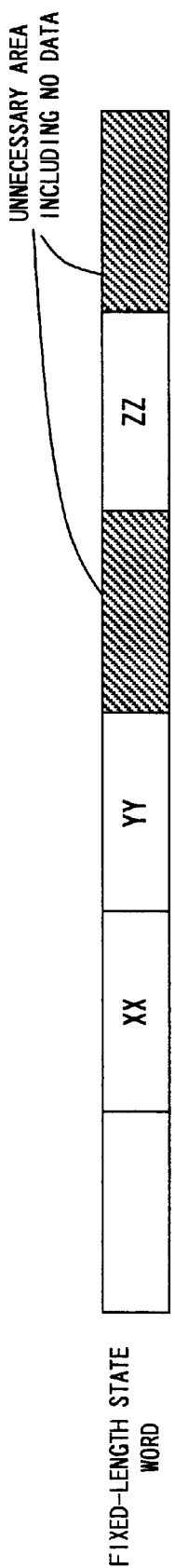
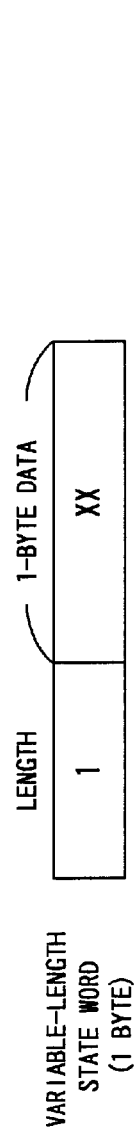
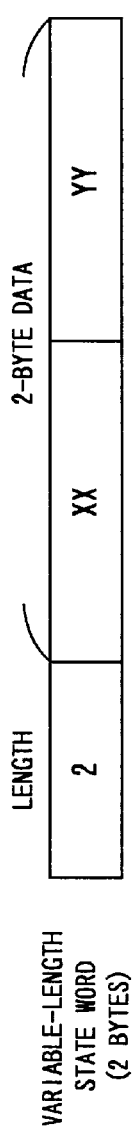
F I G. 13A
F I G. 13B
F I G. 13C

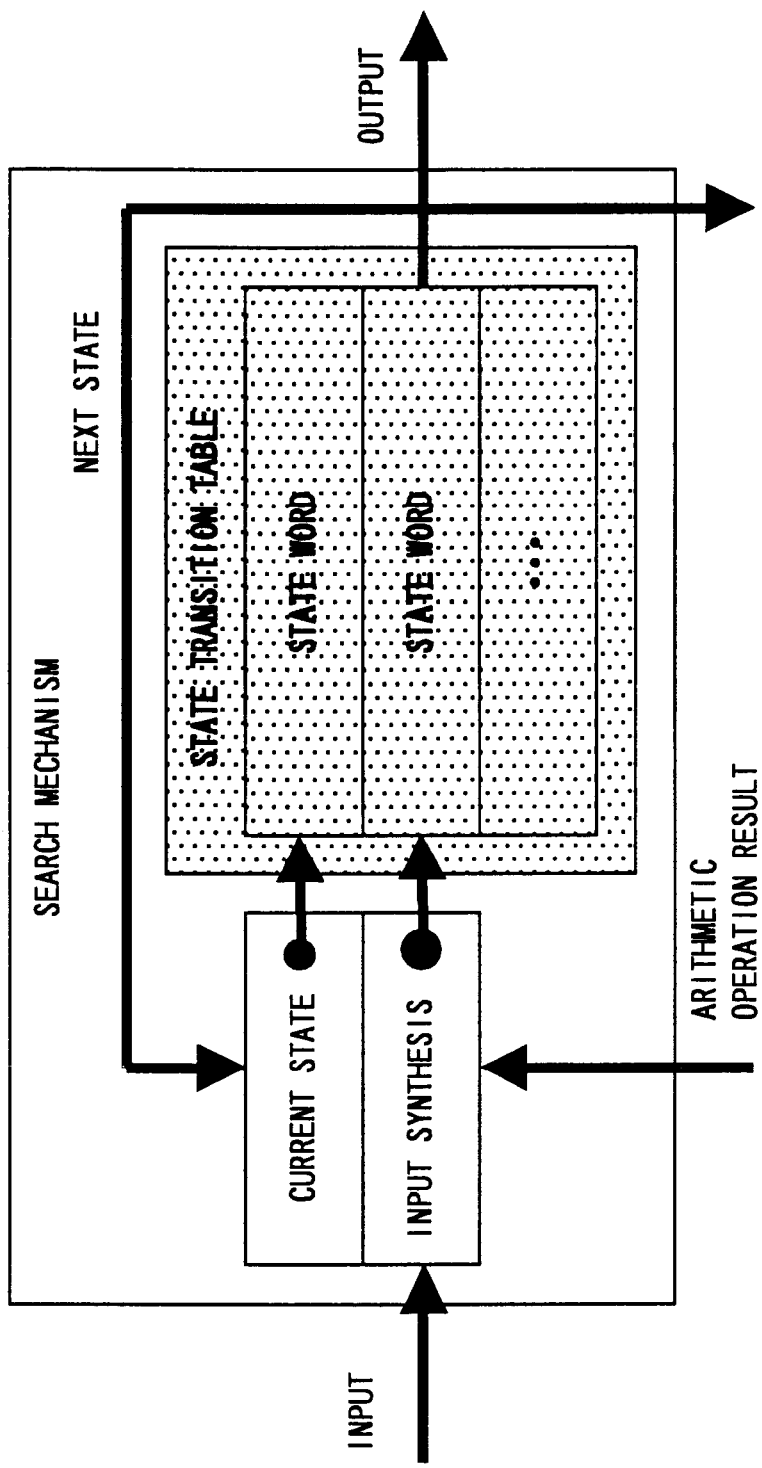
F I G. 15

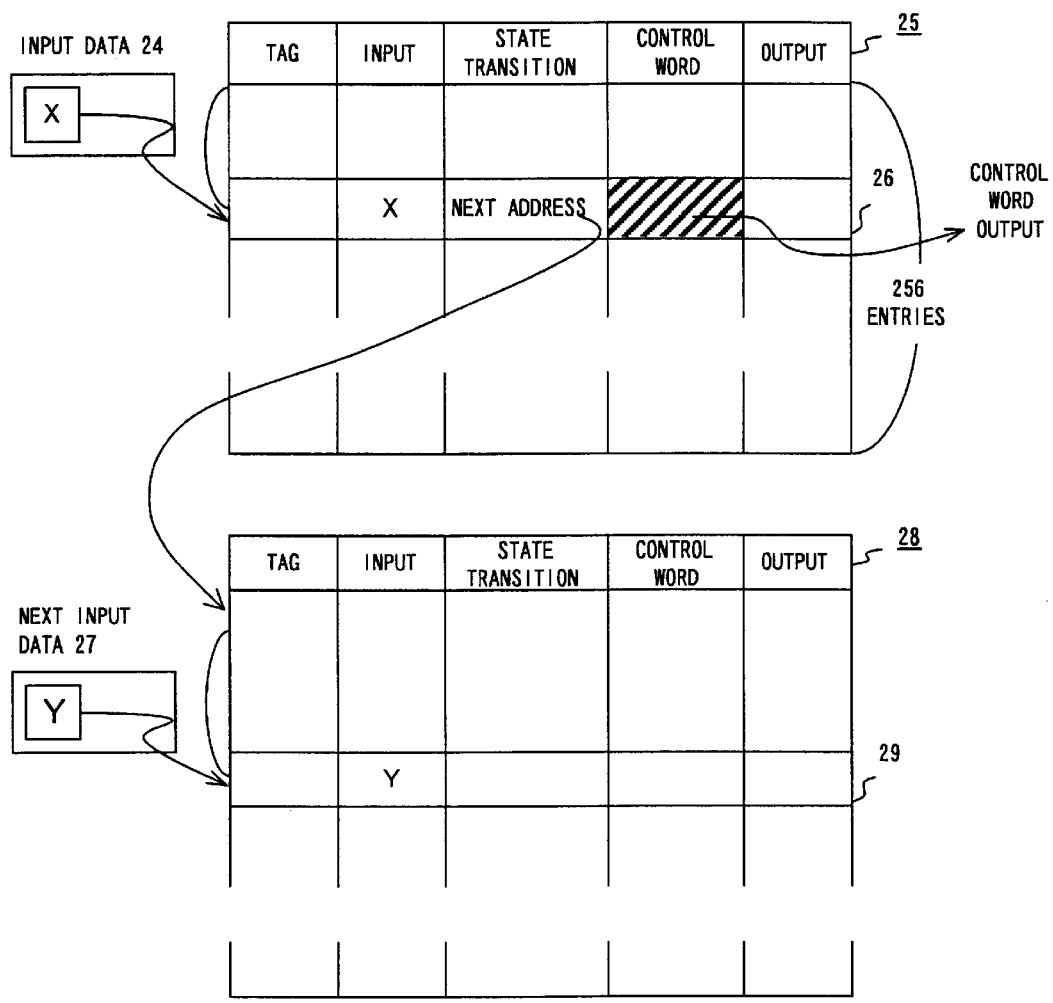
F I G. 16

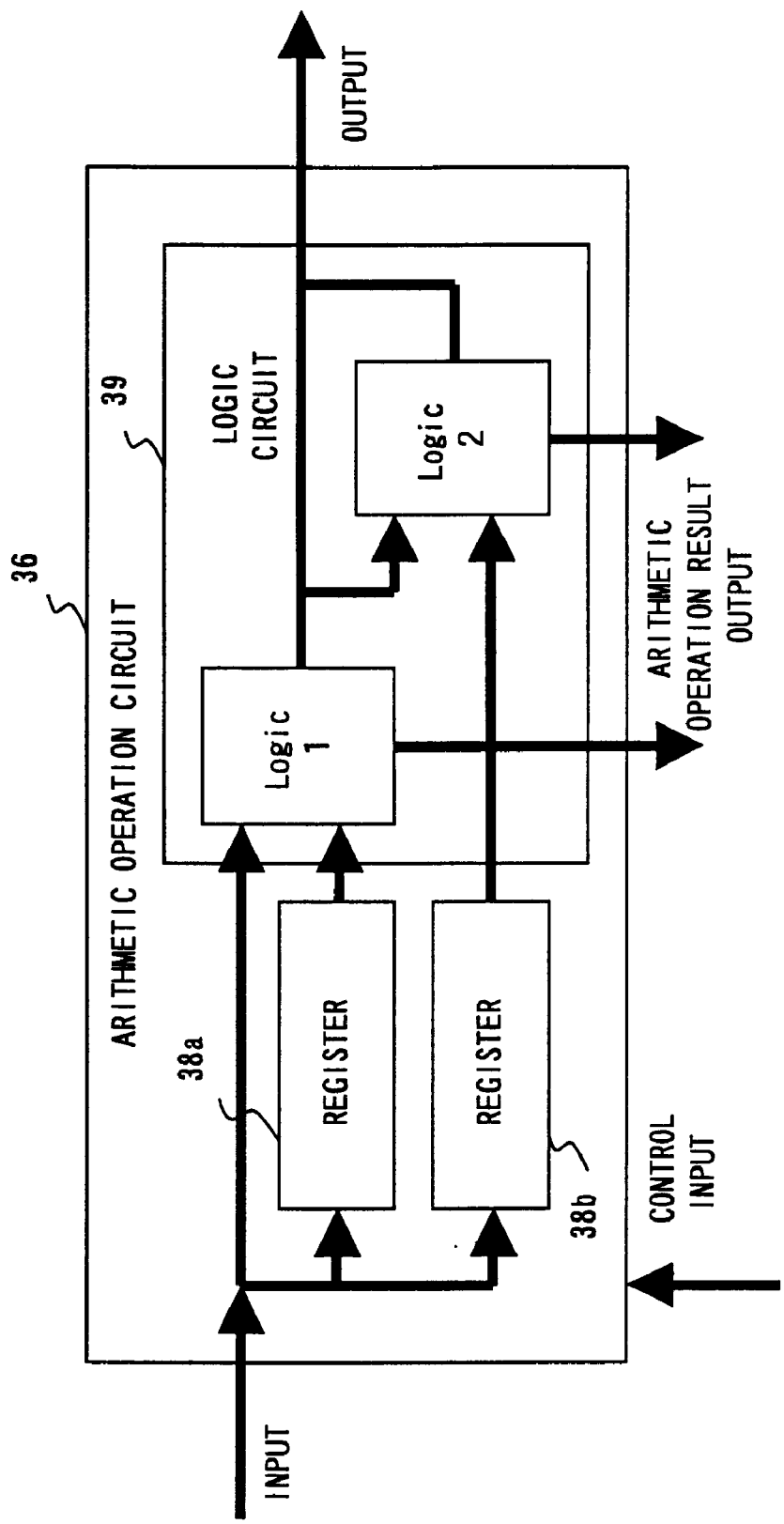
F I G. 1 8

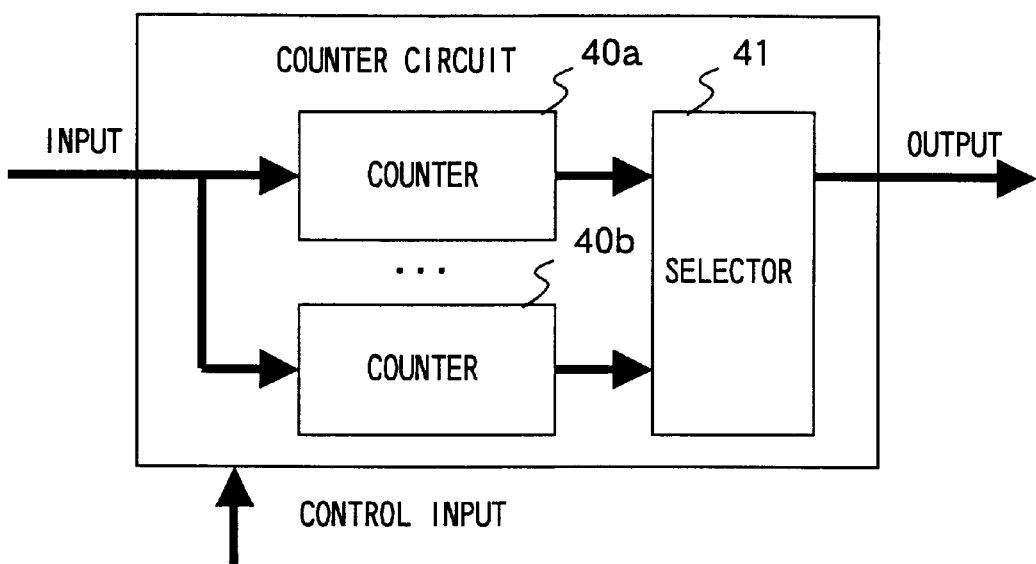
F I G. 1 9

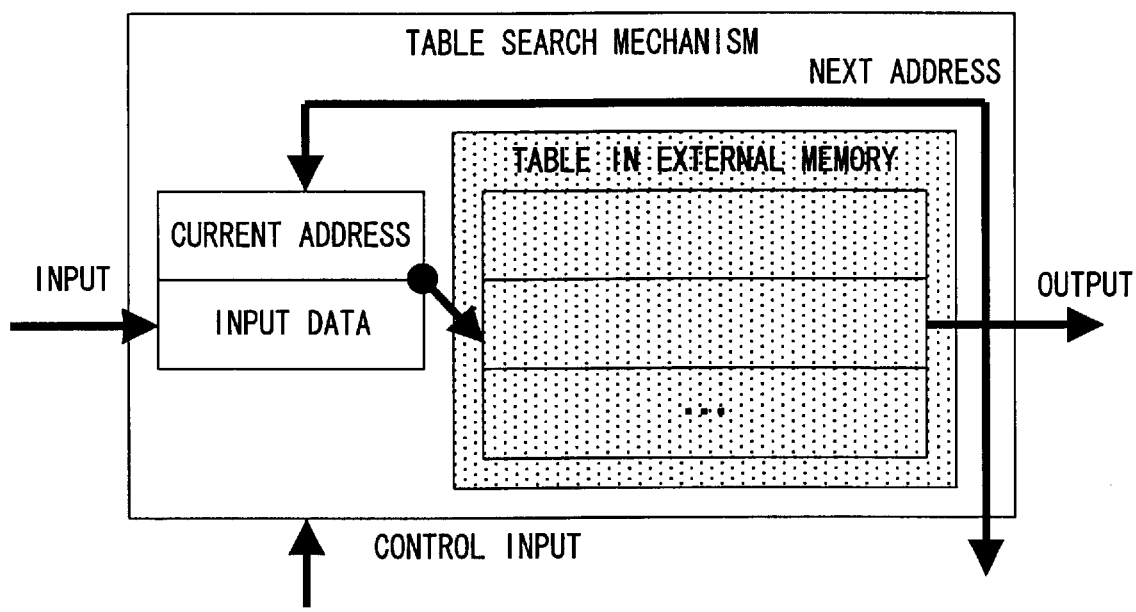
F I G. 2 1

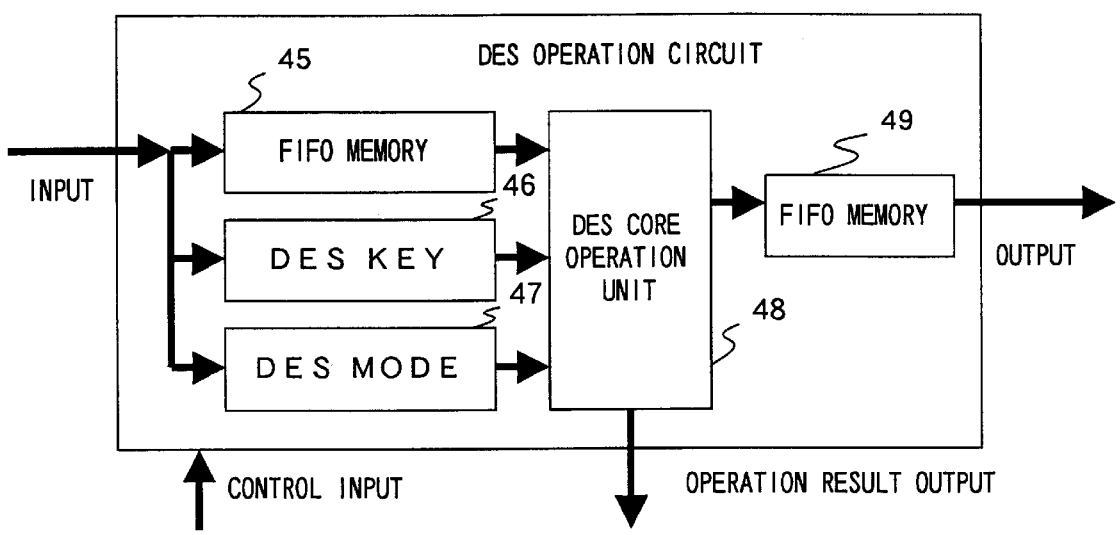
F I G. 2 3

| Ver. | IHL | Type of Service | Total Length (In Octet) | |
|---|---|---|---|---|
| Identification | | | Flags | Fragment Offset |
| Time to Live | | Protocol | Header Checksum | |
| Source Address | | | | |
| Destination Address | | | | |
| Option (if any) | | | | |

F I G. 2 4

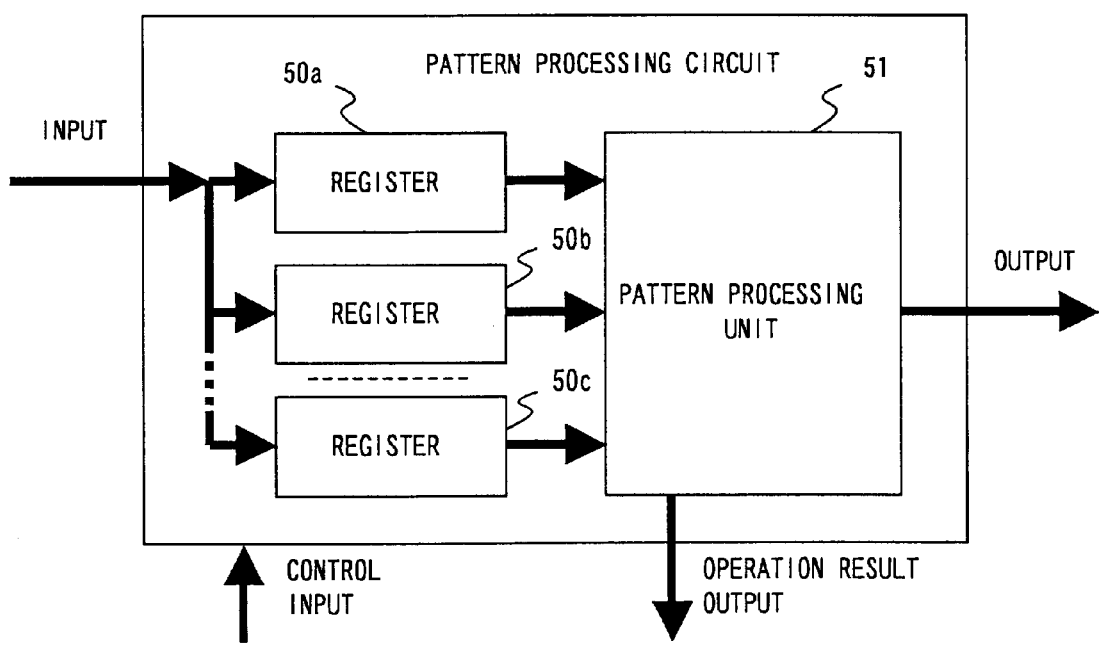
F I G. 2 5

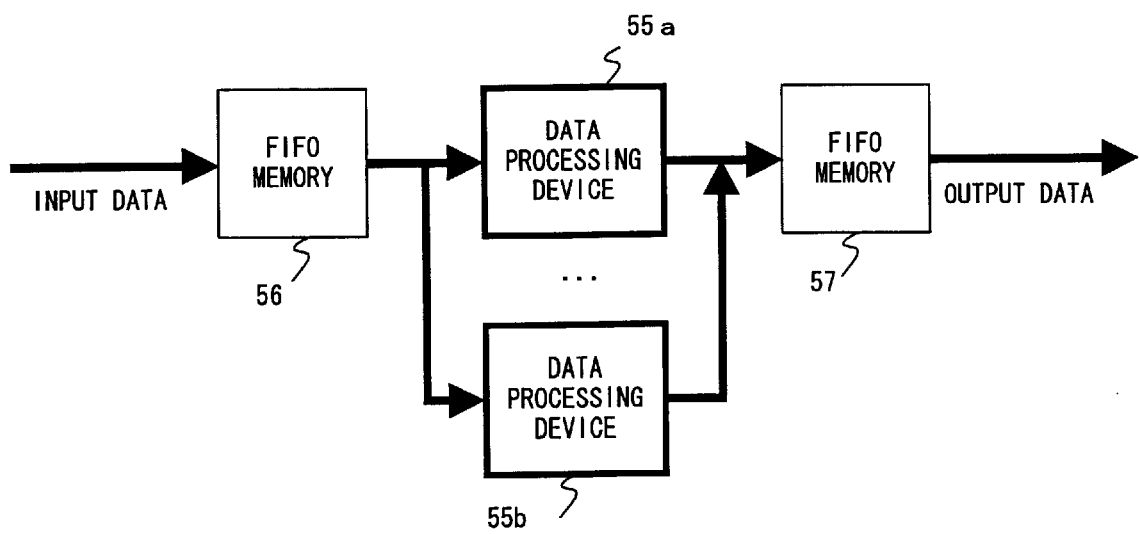
F I G. 2 7

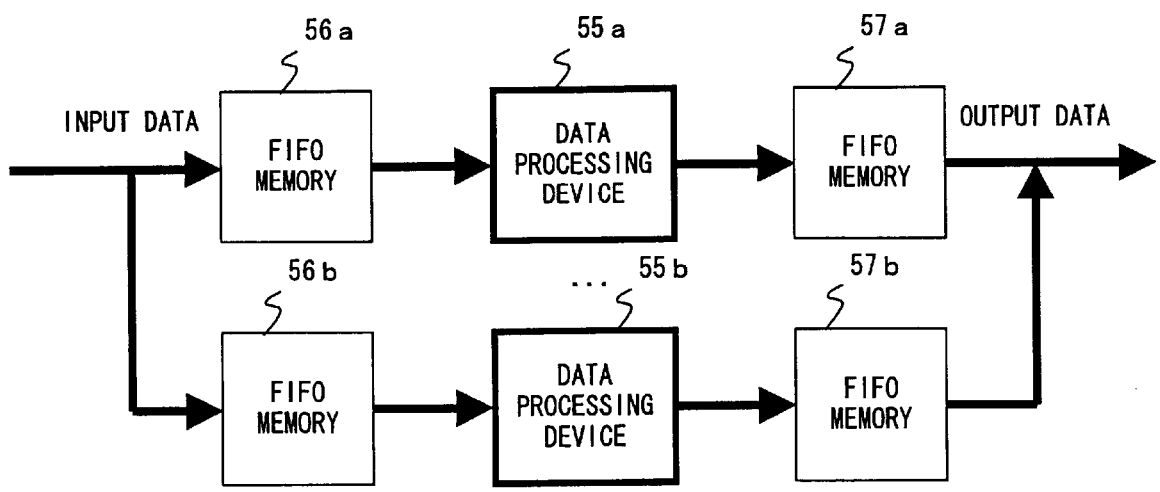
F I G. 2 8

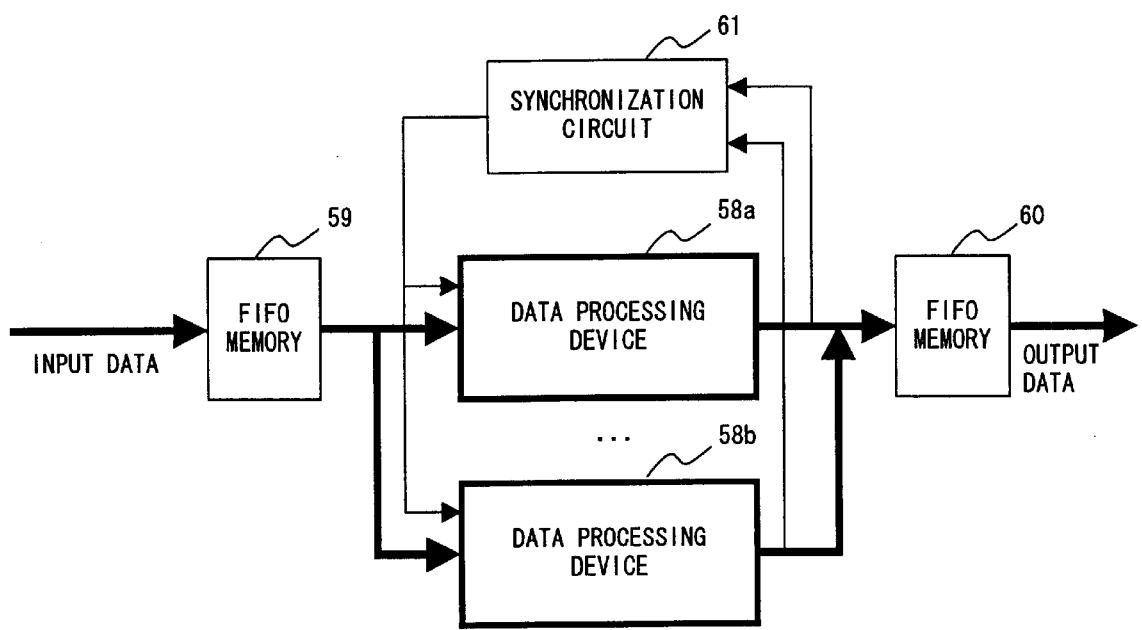
F I G. 29

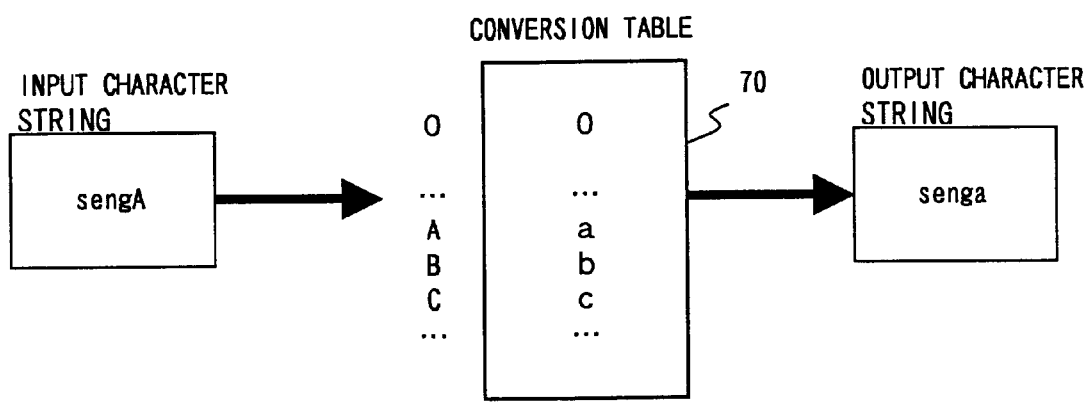
F I G. 31

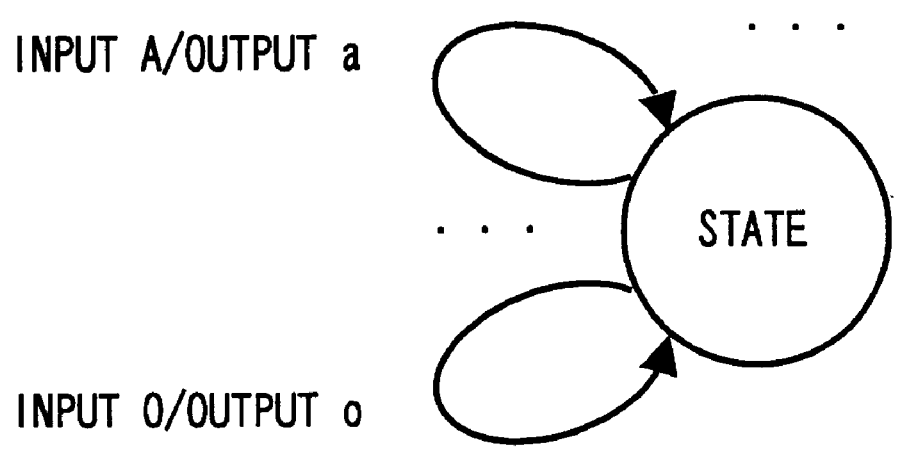
F I G. 3 2

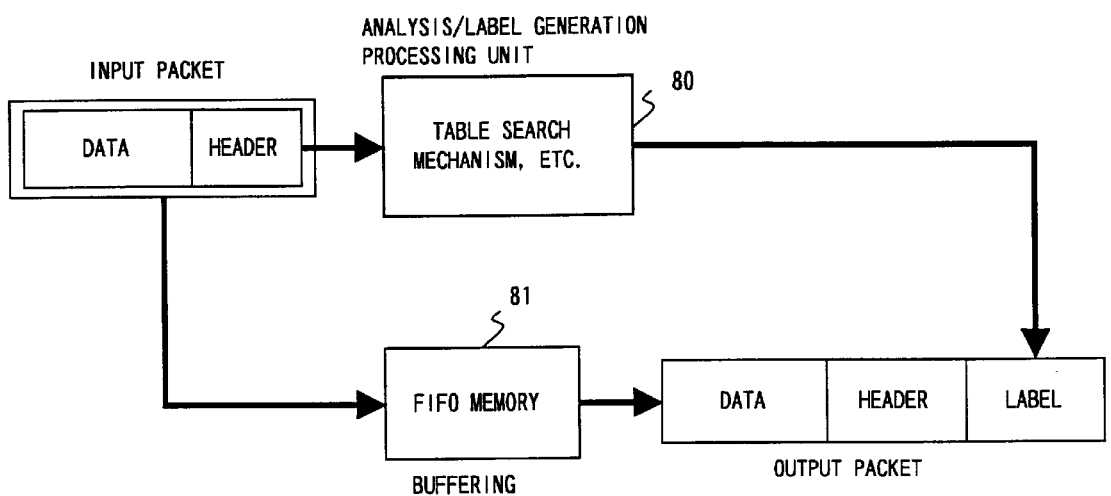
F I G. 3 3

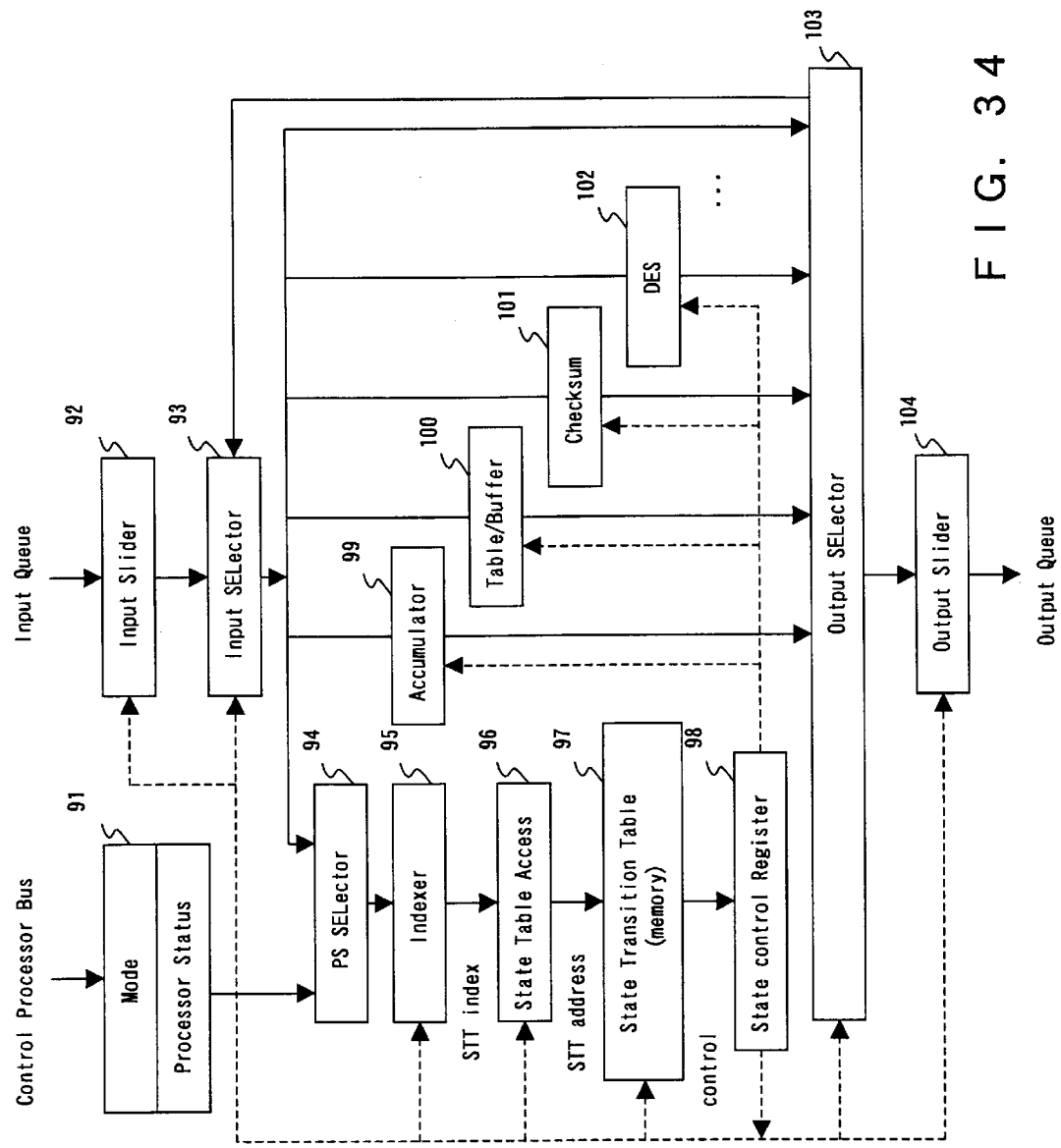
F I G. 34

|    | byte0 | byte1 | byte2 | byte3 | byte4 | byte5 | byte6 | byte7 |
|----|-------|-------|-------|-------|-------|-------|-------|-------|
| W0 | D0    | D1    | D2    | D3    | D4    | D5    | D6    | D7    |
| W1 | D8    | D9    | D10   | D11   | D12   | –     | –     | –     |

↓ 1-BYTE SLIDE

|    | byte0 | byte1 | byte2 | byte3 | byte4 | byte5 | byte6 | byte7 |
|----|-------|-------|-------|-------|-------|-------|-------|-------|
| W0 | D1    | D2    | D3    | D4    | D5    | D6    | D7    | D8    |
| W1 | D9    | D10   | D11   | D12   | –     | –     | –     | –     |

↓ 2-BYTE SLIDE

|    | byte0 | byte1 | byte2 | byte3 | byte4 | byte5 | byte6 | byte7 |
|----|-------|-------|-------|-------|-------|-------|-------|-------|
| W0 | D3    | D4    | D5    | D6    | D7    | D8    | D9    | D10   |
| W1 | D11   | D12   | –     | –     | –     | –     | –     | –     |

FIG. 35

DYNAMICALLY CONFIGURED PROCESSING OF COMPOSITE STREAM INPUT DATA USING NEXT CONVERSION DETERMINING STATE TRANSITION TABLE SEARCHED BY CONVERTED INPUT DATA

BACKGROUND OF THE INVENTION

1. Field of the Invention

The present invention relates to a data processing device such as a processor, and more particularly, to a data processing device which eliminates the need for reading an instruction sequence, searches a memory in correspondence with input data, and executes a process for the input data according to a search result, in order to quickly process a series of data (stream data) such as time-series data generated in a sampling cycle, etc.

2. Description of the Related Art

There are a great many cases in which a series of data (stream data) such as communication packets for use in a network communication, video/audio data, time-series data generated from each type of a sensor in a sampling cycle, data read/written from/to a disk, arithmetic operation data of a data flow processor, communication data between processors in a parallel computer, and the like is processed. The stream data process referred to here has one or a plurality of the following characteristics.

- A) Data having a fixed word length is input to a processing device at a constant speed or intermittently.
- B) A plurality of data types are sometimes multiplexed into stream data.
- C) A process output can be new stream data.
- D) A process output can be buffered in a memory.
- E) Input or output stream data can be plural.
- F) A process sequence can be configured with a finite state machine.
- G) A table search is included as one of process capabilities. The table search is sometimes made by using a stream data word as a key.
- H) A special arithmetic operation is included as one of the process capabilities. The arithmetic operation must be performed for a stream data word.

Here, the finite state machine is also the name of an automaton the capability of which is in the lowest class in a sense defined by the theory of formal languages. In this specification, the term "finite state machine" is unavoidably used. This means a state machine that is defined by a finite state and a state transition in a general sense.

Stream data is transferred to a processing device such as a computer, etc., via a transmission line such as a network, a bus, etc., and is processed.

The speed of such stream data has been becoming faster year by year with an increase in a device speed. By way of example, for a communication packet, the speed of 1 Gbps (125 MB/sec) to 4 Gbps (500 MB/sec) is required even at present, and a further increase in the speed is promised. For example, if stream data with a 1-Gbps transfer speed is processed in units of 1 byte, 8 ns (125 MHz) is required to process the data. Even if this stream data is processed in units of 4 bytes, 32 ns (31.25 MHz) is required. The process speed becomes a problem if data is processed at high speed. Furthermore, in terms of capabilities, a complex process such as an image process, a communication process, etc. is required, and at the same time, it is demanded to allow the contents of a process to be flexibly changed.

The present invention aims at general-purpose data processes such as a stream data process, etc., and particularly relates to a method configuring a processing device (processor) that can change the contents of a process.

The conventional techniques for processing stream data are broadly classified into hardware and software methods. Theoretically, a stream data can be implemented by both hardware and software methods. However, processing performance and ease of a capability change must be considered.

The hardware method is a widely used method implementing process capabilities with dedicated hardware. With a dedicated hardware process, dedicated hardware is configured to allow stream data to be processed at the same speed as an input/output speed. Therefore, input stream data can be sequentially processed each time one word is input, without buffering the data (sequential processing method). However, a transfer rate and a processing rate may be sometimes adjusted via some elastic buffer although buffering is not needed as described above. The sequential processing method has an advantage that its process delay normally becomes smaller than that in a batch processing method with which the whole of a series of stream data is processed after being stored in a memory.

The performance of a current CMOS device is approximately 250 MHz. Therefore, a small delay and high performance can be implemented with the sequential processing method by suitably adjusting a word to be processed. At this time, however, a possibility of a capability change becomes a problem. A conventional solution to this problem is, for example, a method using a reconfigurable device such as an FPGA (Field Programmable Gate Array), a PLD (Programmable Logic Device), etc. The method using a reconfigurable (programmable) device is used in some Internet routers. However, since the circuitry amount that can be implemented with the current programmable devices is limited and its performance is low, this method is used only in limited fields. Even if a large-scale and high-performance programmable device becomes available with technological advances in the future, also the transfer speed of stream data using the same technology is expected to increase. Therefore, a field to which a reconfigurable device is applied will be limited only to a field of low performance.

The software method is a method implementing process capabilities with software by using a general-purpose or a dedicated processor. The software method has an advantage that a capability can be changed with ease. This is because capabilities are implemented by software. Furthermore, since an actually existing processor is used in a computer system, this method has another advantage that only a minimum of hardware is required for implementation, which leads to a reduction in cost.

However, there are some problems in terms of performance. Normally, a plurality of instructions must be executed to process one stream data. Therefore, a processor must run at a speed of several multiples of the transfer speed of stream data. Assuming that 10 instructions must be executed to process one stream data, a processor which runs at 312.5 MHz or faster must be fully operated to process 1-Gbps stream data in units of 4 bytes. That is, the software method is effective if the transfer speed of stream data is low, but has a difficulty in processing stream data with high speed that is close to the operating frequency of a processor.

Furthermore, since a computer normally runs under an administration system such as an operating system, etc., the computer cannot immediately start its processing in all cases when stream data is generated. Therefore, a series of stream data is stored in a memory and batch-processed after being accumulated to some amount, so that processed data is obtained or again transferred to another location. Such a batch processing method is a representative method adopted in a normal computer system. With this method, stream data is stored in a memory via an I/O bus. Upon completion of storing a series of data, a computer processes the data with software, and transfers the result of the process to another location via an I/O bus upon terminating the process. Specifically, many computer network processes, image processes, Internet routers, etc. adopt this method. However, because data is stored in a memory, this method poses a delay occurrence problem. For this reason, the processing is performed intermittently although its processing ability is sufficient, and the sequential processing method with a small delay cannot be adopted. This is widely known as a real (actual) time problem.

In summary, the hardware method enables high-speed processing, but has a difficulty in capability change. In the meantime, the software method can flexibly change a capability, but has a problem in data processing performance. Therefore, a processing method that can flexibly change a capability, and can sequentially process data is demanded.

A conventional processor is a stored program type called a Neumann type processor, and is composed of an arithmetic operation mechanism and a program execution mechanism, which are fundamental elements as hardware, as shown in FIG. 1. A program is intended to implement process capabilities by using these pieces of hardware, and a capability can be changed by modifying the program. With the stored program method, the following hardware operations must be performed to process data: an instruction structuring a program which implements process capabilities is fetched, and the fetched instruction is decoded and executed. If process contents are complicated, a plurality of instructions must be executed to process one data. Therefore, in general, the data processing performance of a stored program type processor is proportional to its instruction execution performance, and the data processing performance is lower than the instruction processing performance. In other words, data processing performance higher than instruction processing performance cannot be obtained.

Additionally, since a plurality of instructions must be executed to process one data, the data processing performance results in 1/n of the instruction processing performance. Here, n is a numerical value that depends on the architecture of a processor or the contents of a process. Normally, n is on the order of 5 to 10 even for simple code conversion, and on the order of 100 to 1000 for a complex communication packet process. Namely, to process stream data with a certain frequency, a processor having the instruction processing performance that is 5 to 1000 multiples of that frequency is required.

With the conventional techniques, improvements are made both from the viewpoint of an instruction processing performance increase, and the viewpoint of n reduction. Cache, pipeline, etc. are improvements from the viewpoint of an instruction processing performance increase, whereas MMX (a registered trademark of Intel Corp.) instructions, which are an instruction set for multimedia processing, is an improvement from the viewpoint of n reduction. Additionally, parallel processing is improvement measures that contribute to both of the above described viewpoints. However, as stated earlier, a stored program type processor cannot essentially free from the restriction such that "instruction processing performance>data processing performance". Since a stream data providing side such as a communications network is configured by dedicated hardware, the relationship of "stream data performance= instruction processing performance>data processing performance" is always satisfied when the same semiconductor technology is used, and the stored program type can never process stream data in real time.

A stored program type processor is a finite state machine that is optimized to process an instruction stream at high speed. A method changing the form of an instruction executed by a processor is conventionally proposed, and a processor architecture comprising such a method is referred to as a dynamic architecture. Examples of a typical method implementing a dynamic architecture include a microprogramming method which is chiefly used in CISC (Complex Instruction Set Computer).

The outline of the microprogramming method is as follows, although its details are omitted here. First of all, as a result of decoding an instruction, the address of a microinstruction corresponding to the instruction is obtained. Microinstructions are a program stored in control storage. The capability of an original instruction is implemented by executing a microinstruction. A microinstruction is implemented in a variety of ways, and is normally composed of a bit string for controlling the resources of processor hardware. An objective capability is obtained by sequentially reading microinstructions, and by applying them to hardware. The fundamental procedure for the process of a microprogram processor is as follows.

Procedural step 1: Reading an instruction.
Procedural step 2: Selecting a process (microinsruction) defined in correspondence with the instruction.
Procedural step 3: Executing the selected process, and returning to the procedural step 1.

A processor instruction can be changed by altering a microinstruction stored in control storage. Note that, however, the conventional form of a microinstruction is almost specific to the resources possessed by processor hardware. An instruction change must be implemented within the range of a processor architecture. Accordingly, the microprogramming method has no flexibility of being able to process arbitrary data. Even if the process can be implemented with a plurality of microinstructions, the process performance is degraded because this is essentially the same as a process performed at a processor program level. RISC (Reduced Instruction Set Computer) is a method devised to overcome the restriction on the performance of a microprogramming process. This indicates that the microprogramming method has a problem in terms of performance.

As described above, the microprogramming method has the architecture restriction and performance problems. An implementation of a normal stream data process with a microprogramming processor does not seem to be proposed conventionally.

As stated earlier, for example, if a stream data process is implemented with the hardware method, high performance can be realized in terms of processing speed, but there is a problem in that a capability change cannot be made with ease.

Furthermore, the software method cannot be free from the restriction such that data processing performance is always lower than instruction processing performance. Also the microprogramming method for implementing a dynamic architecture has a problem such that a capability cannot be flexibly changed.

SUMMARY OF THE INVENTION

An object of the present invention is to provide a data processing device that can execute general-purpose data processes such as a stream data process, etc. by making a processor execute not instructions but stream data directly with the use of a dynamic architecture analogous to a microprogramming method, and can change a process capability with ease.

A data processing device according to the present invention comprises an input converting unit, a memory searching unit and an arithmetic operation unit.

The input converting unit obtains memory search data from input data.

The memory searching unit searches, based on the search data, a state transition table storing as an entry a state word which designates a preset process, and reads the state word corresponding to the process to be performed for the input data.

The arithmetic operation unit determines the process to be performed for the input data based on the contents of the state word read by the memory searching unit, and performs the process.

According to the present invention, a high-speed data processing device can be implemented at low cost.

With the data processing device according to a preferred embodiment of the present invention, a search value for a state transition table can be obtained from input data depending on a state, since the input data in various formats is analyzed. This search value can be obtained by changing its obtainment way, depending on a state.

Furthermore, a data processing device that can easily change a process capability by altering the contents stored in a memory in which a state transition rule is stored.

BRIEF DESCRIPTION OF THE DRAWINGS

FIG. 2 is a block diagram showing the principle of a data processing device according to a preferred embodiment of the present invention;

FIG. 3 shows the fundamental configuration of a data processing device using a table;

FIG. 5 explains a finite state machine processing stream data;

FIG. 6 explains an execution cycle of the finite state machine;

FIG. 7 explains the synchronization of operations inside the finite state machine;

FIG. 10 explains a mask and gather process;

FIG. 11 exemplifies the fundamental structure of a state transition table;

FIG. 12 shows the configuration of a finite state machine in the case where information indicating the length of a state word is included within the state word;

FIG. 13A shows a state word having a fixed length;

FIGS. 13B and 13C respectively show the state words having variable lengths, in which the information indicating the length of a state word is included within the state words;

FIG. 15 explains the operations of a search mechanism;

FIG. 16 exemplifies a search in state transition tables;

FIG. 18 exemplifies the configuration of a normal arithmetic operation circuit;

FIG. 19 exemplifies the configuration of a counter circuit;

FIG. 21 explains the operations of a table search mechanism;

FIG. 23 exemplifies the configuration of a DES operation circuit;

FIG. 24 shows the header of an IPv4 packet;

FIG. 25 exemplifies the configuration of a pattern processing circuit as an arithmetic operation circuit;

FIG. 27 exemplifies the configuration of a system where data processing devices are connected in parallel;

FIG. 28 exemplifies the configuration of a system where FIFO memories are arranged on the input and output sides of data processing devices that are connected in parallel;

FIG. 29 exemplifies the configuration of a system where a synchronization circuit for synchronizing the operations of a plurality of data processing devices is included;

FIG. 31 explains an ASCII code conversion process;

FIG. 32 explains a state machine that makes a state transition in the ASCII code conversion process;

FIG. 33 explains a packet labeling process;

FIG. 34 exemplifies the configuration in the case where the data processing device according to this preferred embodiment is implemented as a stream processor processing IP packets;

FIG. 35 explains the operations performed by an Input Slider 92 and an Output Slider;

DESCRIPTION OF THE PREFERRED EMBODIMENTS

Figure 1:
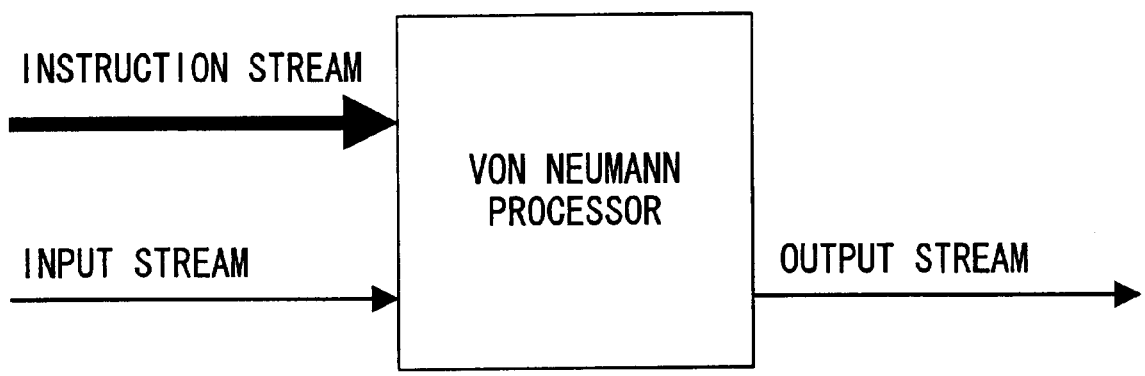
FIG. 1 explains a stream data process performed by a stored program type computer.

FIG. 2 is a block diagram showing the principle of the configuration of a data processing device according to a preferred embodiment. This figure shows the configuration of a data processing device 1 using a table, which is intended to implement a stream processor processing stream data.

The stream processor referred to in this specification is a processor that recognizes various stream data, for example, input IP packets, as instructions and executes the instructions. The stream processor can interpret as instructions data structures that are more complex and diversified than those for a conventional processor, and can execute the instructions.

In FIG. 2, an input converting unit 2 converts input data into memory search data, for example, memory search data included in input data into memory search data of a fewer number of bits. Note that, however, input data itself is also available as memory search data depending on a configuration.

A memory searching unit 3 searches a memory 4 with the memory search data, and reads a state word, which is data including the contents of a process to be performed for input data and is stored in one entry within a state transition table, in correspondence with the state of a process to be performed for input data.

An arithmetic operation unit obtains access information to the state transition table, which corresponds to the state of the process to be performed for next input data, and performs an arithmetic operation corresponding to the contents of the state word for the input data, depending on the contents of the read state word.

This preferred embodiment may further comprise a state transition table rewriting unit 6 changing the contents of the state transition table stored in the memory within the data processing device before or during a data process.

The state transition table rewriting unit 6 rewrites the state transition table according to an instruction external from the data processing device 1 or a rewrite instruction which dynamically occurs within the data processing device before or during a data process.

In this preferred embodiment, the above described state word includes one or more of four areas such as an area for storing data on an input, an area for storing access information to a state transition destination, an area for storing data on a result output, and a tag area indicating the configuration of a state word. In this case, the state word may be configured to have a fixed length that is determined depending on which of the four areas the state word includes.

Additionally, the state word may be configured to always include the tag area. In this case, the tag area is not included in the state word itself, and a plurality of tag registers for storing tags which respectively correspond to the area configurations of state words may be arranged for each area configuration of the state word, and the memory searching unit 3 may be made to identify the area configuration of the state word by determining in which tag register a tag is stored.

In this preferred embodiment, the input converting unit 2 can also perform a mask and gather process for gathering up a plurality of bits in arbitrary positions within input data in arbitrary successive positions within the bit assignment corresponding to the input data.

Additionally, the memory searching unit 3 obtains the address of a state word by synthesizing the output of the input converting unit 2 with the base address of the memory, and can also use the memory address included in the state word stored at the obtained address as a base address of the memory search to be made next.

According to this preferred embodiment, the arithmetic operation unit 5 may further comprise a register unit for storing data required for an arithmetic operation, and an arithmetic operation performing unit performing an arithmetic operation by using the data stored in the register unit and input data.

In this case, the arithmetic operation processing unit may further comprise a FIFO memory unit for delaying an output resultant from an arithmetic operation while performing the arithmetic operation for the input data.

Additionally, according to this preferred embodiment, the arithmetic operation unit 5 may further comprise a table storing an arithmetic operation result corresponding to input data, and the arithmetic operation performing unit may output an arithmetic operation result by searching the table in correspondence with the input data.

Furthermore, the arithmetic operation unit 5 may further comprise an input FIFO memory unit for temporarily storing input data, and an output FIFO memory unit for temporarily storing the output of the arithmetic operation performing unit.

Still further, according to this preferred embodiment, the arithmetic operation processing unit may comprise a register unit having a plurality of areas in correspondence with the data structure of input data, so as to store the input data in the plurality of areas by dividing the data, and to perform a predetermined process for the whole of part of the stored data.

The predetermined process in this case may be a process for determining whether or not stored data matches a predetermined data structure pattern, or a process for extracting values from the areas of the input data, for gathering up the extracted values as data in a predetermined form, and for obtaining the information indicating the characteristic of the input data from the gathered data.

According to this preferred embodiment, the arithmetic operation unit 5 may comprise a search data converting unit converting input data into memory search data of a fewer number of bits as search data for the memory for storing the data required for an arithmetic operation process.

Still further, according to this preferred embodiment, a data processing system, in which the data processing devices explained by referencing FIG. 2 are connected in series directly or via a buffer memory, may be configured.

In this case, the data processing system may further comprise a process synchronizing unit providing a signal for synchronizing the processes of the data processing devices with the data processing devices upon receipt of a process state indication signal from some or all of the data processing devices configuring the system.

Still further, according to this preferred embodiment, a data processing system may be configured by data processing devices having the configuration explained by referencing FIG. 2, to each of which input data is provided directly or via a buffer memory and are connected in parallel.

In this case, when data for the data processing devices are multiplexed and input to the data processing system, the input data may be identified with a predetermined method and input to predetermined processing devices among the data processing devices.

Still further, when a plurality of data are multiplexed and input to the data processing system via a bus the areas of which are partitioned by addresses, the multiplexed and input data may be identified with a predetermined method in correspondence with the address areas within the bus, and the identified data may be input to predetermined data processing devices.

The data processing device according to this preferred embodiment may also be implemented by generalizing or simplifying the data processing system explained by referencing FIG. 1.

For example, the data processing device may comprise: an input converting unit converting input data into memory search data; a memory searching unit searching a table, which stores as an entry the data including the contents of a process to be performed for the input data, by using the memory search data, and reads a search result from the table;

and an arithmetic operation unit obtaining access information to a table corresponding to the process to be performed for the next input data in correspondence with the contents of the read data, and performing an arithmetic operation according to the contents of the read data.

Additionally, the data processing device may comprise: an input converting unit converting input data into memory search data; a memory searching unit reading data stored in a table within a memory by using the memory search data; and an arithmetic operation unit performing an arithmetic operation for the input data in correspondence with the read data.

A table processing device using a table according to this preferred embodiment not executes program instructions, but processes input data directly. Fundamental procedure for an input data process is as follows.

Procedural step 1: Reading input data.
Procedural step 2: selecting the process defined in correspondence with the input data.
Procedural step 3: Executing the selected process, and returning to the procedural step 1.

This procedure is essentially the same as that in the case where a microprogramming type processor executes an instruction. The present invention builds a dynamic architecture that does not need to read an instruction stream and implements a stream data process by advancing the conventional microprogramming method by one step. A finite state machine that analyzes input data and performs a data process is configured to implement such a data processing device. Furthermore, the contents of the state transition table stored in the memory are updated before or during a process in order to change a process capability, thereby changing the configuration of the finite state machine.

FIG. 3 shows the fundamental configuration of a data processing device 1 using a table.

The data processing device 1 using a table comprises an arithmetic operation mechanism 8, a programmable memory 9, and a finite state machine 10. The arithmetic operation mechanism 8 processes input data based on an instruction of the finite state machine 10. The finite state machine 10 determines the process to be performed for the input data according to the input data and a state transition table to be described later. The configuration of the finite state machine 10 can be changed depending on a setting within the programmable memory 9, and performs a process according to the contents of the programmable memory 9. Note that the arithmetic operation mechanism 8 may be configured as part of the finite state machine 10.

Furthermore, the data processing device 1 using a table comprises a data memory, which is used as an external storage for storing a table that is too large to be included within the data processing device 1 using a table, or is used as a data buffer.

Figure 4:
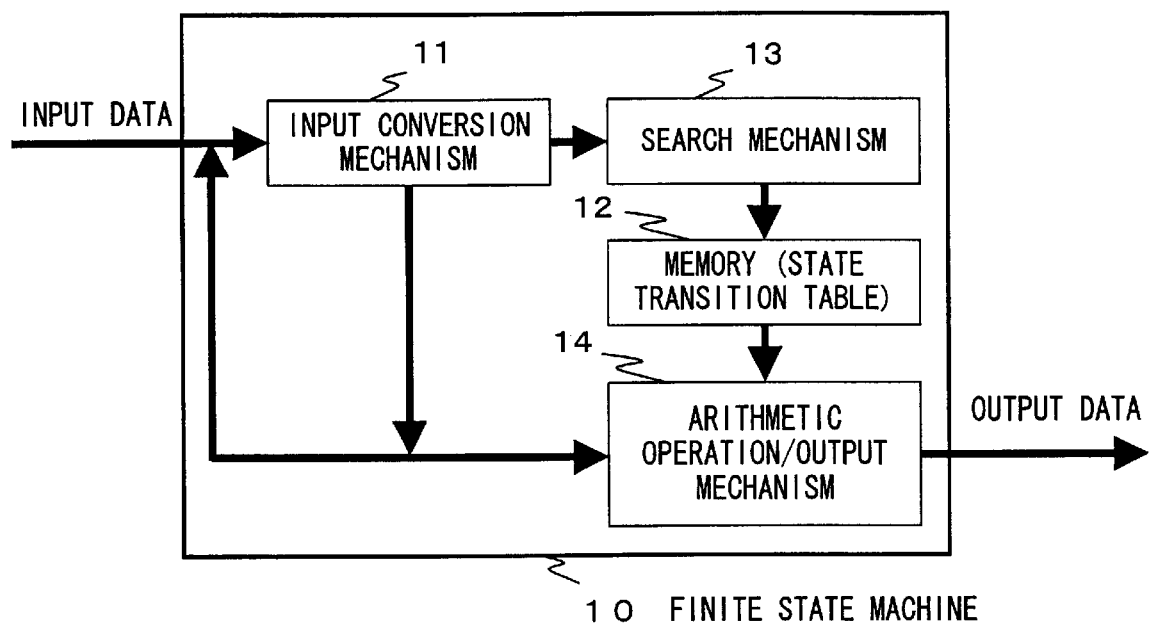
FIG. 4 is a block diagram showing the fundamental configuration of a finite state machine.

FIG. 4 is a block diagram showing the fundamental configuration of the data processing device, which is a finite state machine, according to this preferred embodiment. The finite state machine is defined by four elements such as an input, a state, a state transition, and an output. The input is the definition of input data in each state. Specifically, the input is the whole or part of input stream data, and internal information of the finite state machine required, by way of example, for an arithmetic operation.

The state is the internal state of the finite state machine, which makes a transition during a process.

The state transition indicates a transition rule from one state to another, and is normally stored in a memory as the form of a state transition table within the finite state machine. The next state transition and output are defined for each input that is defined in one state.

The output is output data defined in correspondence with a state. Specifically, the output is the whole or part of stream data to be output, a control word for controlling hardware, or the like.

The finite state machine performs operations similar to those of a sequential circuit. That is, the operation at the first stage of the sequential circuit is performed in correspondence with one state in a certain cycle, and the operation at the next stage of the sequential circuit is performed in correspondence with the state of the transition destination in the next cycle. Thereafter, similar operations are repeated.

FIG. 4 shows the most fundamental preferred embodiment of the finite state machine. The finite state machine 10 comprises an input conversion mechanism 11, a memory 12 for storing a state transition table, a search mechanism 13, and an arithmetic operation/output mechanism 14. The input conversion mechanism 11 converts, for example, memory search data included in input data into a memory search value of a fewer number of bits, and provides the converted value to the search mechanism 13 and, if necessary, the arithmetic operation/output mechanism 14.

The search mechanism 13 searches the state transition table stored in the memory 12 with the memory search value provided from the input conversion mechanism 11. As will be described later, the state transition table is composed of a plurality of entries, each of which stores a state word corresponding to the state of an arithmetic operation process to be performed for the input data, etc. The state word stores the first address of the next state transition table, that is, the address of the state transition destination, for example, in addition to a control word.

The arithmetic operation/output mechanism 14 performs processes such as an arithmetic operation for input data based on the contents of the searched state word, and outputs the resultant data externally to the finite state machine 10 as occasion demands.

In this preferred embodiment, also a configuration implemented by further generalizing or simplifying the configuration shown in FIG. 4 may be used. For example, the data processing may have a configuration in which the state transition table is not arranged in the memory 12, and information designating the process for input data and information about the next state transition destination are stored in the memory as arbitrary data, to which accesses are made with parameters obtained from the data input in each cycle, so that an output is obtained by performing an arithmetic operation with a result of an access to the memory or the input data, or the next memory access destination is obtained.

The data processing device may have another configuration in which its state does not make a transition, a memory is merely accessed with a tag obtained from input data, and an output is obtained by sequentially performing an arithmetic operation, etc. for the input data with arbitrary data which designates the process for the input data and is stored in the memory. In this case, parameters are obtained from the data sequentially input in respective cycles, and the access destination of the memory is determined from the parameters. However, the operation corresponding to the acquisition of the next memory access destination, that is, a state transition, is not performed. If such a process for input data can be performed only with fixed memory data without making a state transition, a data processing device having a simple configuration using fixed data can be implemented.

The following description refers to the contents of the present invention by using the most fundamental configuration shown in FIG. 4. Here, the operations of a data processing device implemented by generalizing or simplifying the above described configuration are not referred to.

In FIG. 4, the memory 12 may be a read-only memory or a programmable memory as far as it is a randomly accessible memory. If a programmable memory is used as the memory 12, the contents of a process can be changed by rewriting the contents of a stored state transition table before or during the process.

The state transition table is rewritten according to an instruction external from the finite state machine or a rewrite instruction that dynamically or internally occurs within the finite state machine before or during a data process.

FIG. 5 shows a stream processor as a finite state machine that performs a predetermined process for input stream data, and outputs the result of the process as output stream data. This finite state machine 10 is reconfigurable. Namely, the configuration of the finite state machine 10 can be statically or dynamically changed by updating the contents of a state transition table stored in a memory within the machine before or during the process.

Next, an execution cycle of the finite state machine is explained by referencing FIG. 6. In this figure, the finite state machine fundamentally runs in synchronization with a single clock. One cycle is composed of four steps such as an input, state transition, execution, and an output. First of all, at the beginning of one cycle, input data is settled. A memory search value is obtained by the input conversion mechanism 11 shown in FIG. 4, and a search in the state transition table, namely, a state transition is started. The state transition means that a state word is determined by a search in the state transition table, that is, a memory access, and the state transition destination, namely, the next state is settled according to the contents of the state word.

A process for input data is started the same time the next state is settled. When an operation result is settled upon completion of the process, its result is output on demand, and the input operation for next data, which corresponds to the next cycle, is started. At the beginning of this cycle, the next input data is settled, and similar operations are repeated thereafter.

The process time of the finite state machine results in a total of the time required for an input, a memory access time searching the state transition table, and a process time of the arithmetic operation/output mechanism. The longest among these times is the memory access time, which is on the order of 4 to 5 ns for an LSI-embedded memory with the current technology. Furthermore, a cycle time required for performing only a simple arithmetic operation is expected to be 10 ns or less. Namely, an operation on the order of 100 MHz promises to be enabled.

As explained by referencing FIG. 5, in principle, one process corresponding to input data is executed in one cycle. However, if a time is required, by way of example, for an arithmetic operation, the next process must wait for the completion of the operation, and synchronization must be established. FIG. 7 explains such operational synchronization.

Figure 8:
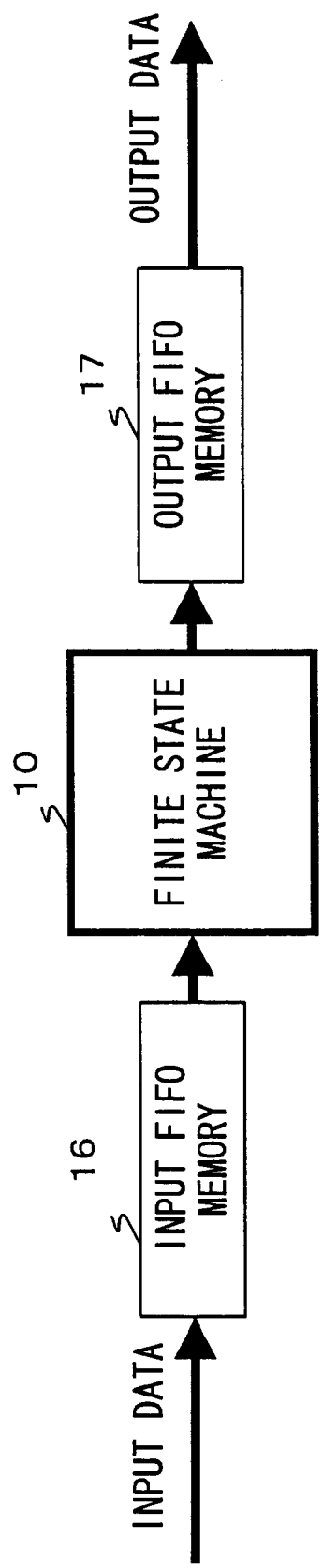
FIG. 8 explains the synchronization of data input and output.

For example, if the finite state machine enters the state where an input operation can be performed, it must stand by in that state in the absence of input data. Additionally, if the time required for processing input data is long, synchronization must be established. FIG. 8 explains the case where the process started in one cycle is not completed by the start of the next cycle. The time point at which the process is completed and an output is settled is during the next cycle, and the start of the input operation for the next data is delayed until at that time point.

Such a control can be implemented by examining the signal that indicates whether or not a process is completed and is output from the arithmetic operation/output mechanism 14, for example, after the arithmetic operation/output mechanism 14 is started up, according to the content of a control word stored in a state word within the state transition table. Notice that, however, the state transition is completed while the arithmetic operation/output mechanism 4 executes the process, and the process corresponding to the next state may be started depending on an operation type, which will be described later.

Input and output stream data is transferred, for example, in synchronization with a network clock in many cases. In these cases, the finite state machine must run at an average of a doubled frequency or faster of such an input/output clock. This is based on Shannon's sampling theorem. Furthermore, a considerable amount of time is required for a process depending on the contents of an arithmetic operation as explained by referencing FIG. 6. In this case, the finite state machine must wait for the completion of the process, and cannot perform a process until the completion of the process even if new stream data arrives.

FIG. 8 explains input/output synchronization for absorbing such a processing speed difference. As shown in this figure, the processing speed difference can be absorbed by arranging FIFO memories on input and output sides of the finite state machine 10. If an input FIFO memory 16 is empty, the finite state machine 10 enters a standby state, and suspends its operations until new data arrives. If an output FIFO memory 1 becomes full, the finite state machine 10 suspends its operations until the FIFO memory 17 has an empty space.

Next, the operations of the constituent elements of the finite state machine shown in FIG. 4 will be further described in detail.

Figure 9:
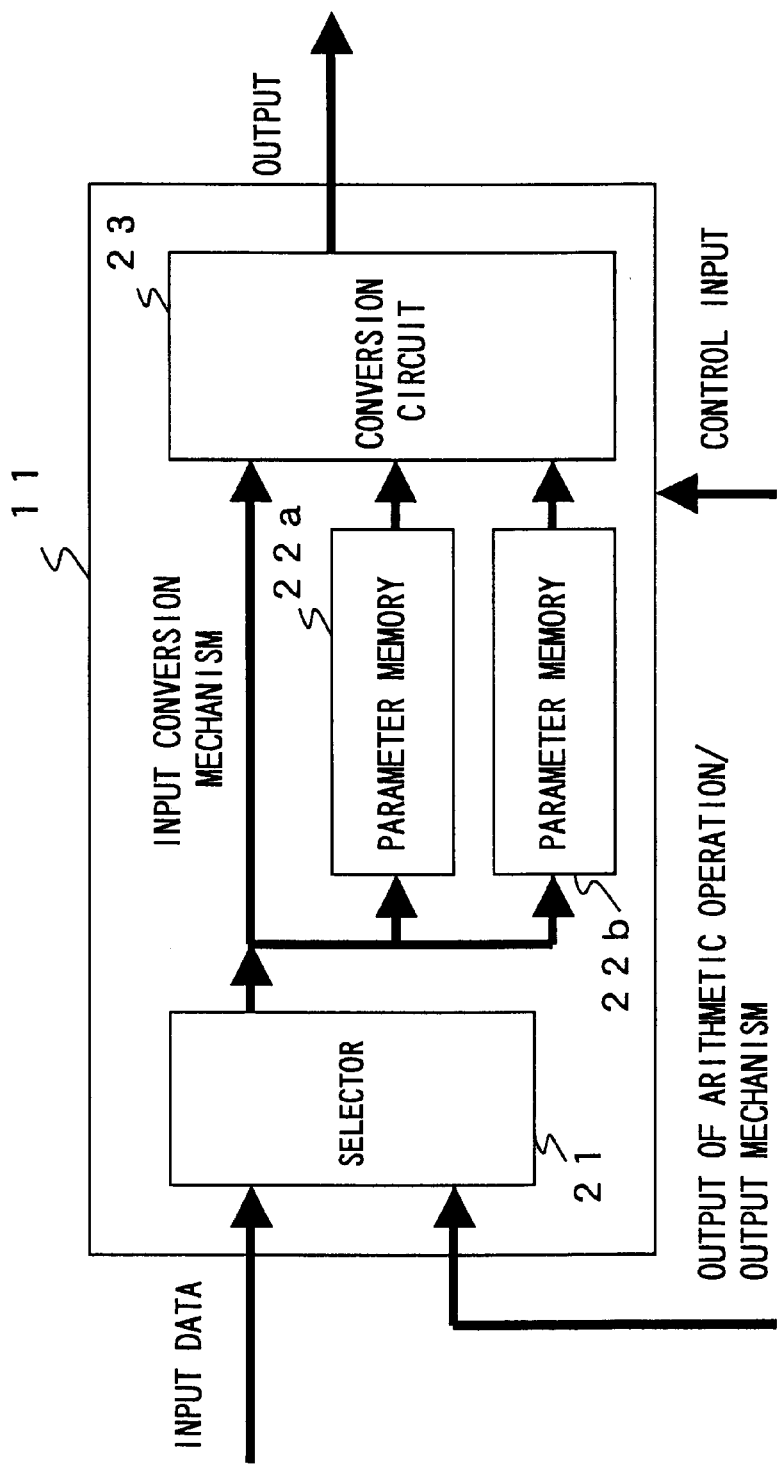
FIG. 9 exemplifies the configuration of an input conversion mechanism.

FIG. 9 exemplifies the configuration of the input conversion mechanism 11. In this figure, the input conversion mechanism 11 comprises a selector 21 for selecting input data or data provided from the arithmetic operation/output mechanism 14, a plurality of parameter memories 22a, . . . , 22b, which store the parameters required for conversion, and a conversion circuit 23 converting input data by using the output of the selector 21 and the contents stored in the parameter memories.

The input conversion mechanism 11 is a mechanism converting memory search data included in input data, for example, into a memory search value of a fewer number of bits in order to increase the efficiency of the search process for a state word within the state transition table stored in the memory 12. By way of example, for a stream processor, the forms of stream data are generally diversified. If a state transition table is generated, by way of example, for stream data input in 4 bytes, entries the number of which is $2^{32}$ (4G) is required for that state transition table. It is difficult to arrange such a large state transition table in a memory accessible at high speed within a chip, and actually, all of input patterns are not valid in many cases. Therefore, the speed of a search process for the state transition table is increased by converting input stream data, by obtaining the data required for the search, that is, a memory search value depending on the state of the converted data, and by searching the table.

FIG. 10 explains a mask and gather (MAG) process as a bit assignment conversion operation performed by the input conversion mechanism. With this process, arbitrary bits or areas within input data are extracted, and a memory search value is generated from the extracted values with a predetermined method. In FIG. 10, an MAG pattern is specified for input data, and a memory search value gathered up on an LSB side is obtained as a process result by performing the MAG process. The process result may be gathered up on an MSB side. Or, the side on which the process result is to be gathered up may be specified. Additionally, gathering positions may be set not to the end of one word, but to halfway positions. By gathering up a process result as a certain number of bits as described above, a search value which can speed up the search can be generated even if the number of entries per state transition table is not the same.

Furthermore, since a search value becomes smaller, the number of entries within the state transition table decreases, leading to a reduction in the size of the state transition table.

It should be noted that the input conversion mechanism according to this preferred embodiment can change how to generate the search value for each input data, for example, by changing an MAG pattern, on the condition that a table is used.

Next, the state transition table will be explained. FIG. 11 exemplifies the fundamental structure of the state transition table. A plurality of state transition tables corresponding to a plurality of states are normally stored within the memory 12. The state transition table is a table defining a state, and is composed of entries (state words) the number of which corresponds to the inputs defined in that state. With the finite state machine shown in FIG. 4, a state transition corresponding to particular input data, and the contents of the process to be performed for the input data are defined according to a state word. One state word, that is, an entry in a state transition table is composed of one or a plurality of areas. As the areas, five areas such as "tag", "input", "state transition", "control word", and "output" are considered.

The "input" is a search data pattern for selecting a state word. The search data pattern may be not only a memory search value resultant from the MAG process performed by the input conversion mechanism 11, but also an immediate address (immediate data: The immediate data is 16-bit data specified by the state word.) itself for a memory access. If a state transition table is searched in comparison with the output of the input conversion mechanism 11, etc., this "input" area is included within the state transition table, and a search pattern is stored in the state word as one area. The "tag" is an identifier for indicating the type or the configuration of the state word, for example, which of the above described "input", "state transition", "control word", and "output" areas is included, or the type of the data within each area such as the data resultant from the MAG process, immediate data, or the like. The "state transition" is a state transition destination, that is, the first address of the state transition table defining the next state. The "control word" indicates the contents of a process such as an arithmetic operation to be performed for input data. The "output" makes a definition for output data, and is a control word (similar to a conventional microinstruction) for controlling hardware which processes output data, such as a slider shifting the data generated by a process in bytes, output data itself, or the like.

The "state word" does not always include these five areas. For example, in the finite state machine that has only one state and one state transition table, a "state transition destination" is unnecessary, and there is no need to define a state transition area in a state word. Also the "input", "control word", and "output" areas are sometimes unnecessary. In this case, such areas are omitted to save a memory space. Remember that, however, the "tag" area is essential for decoding a state word in a normal configuration.

The "tag" among the areas of a state word is an identifier for indicating the type or the configuration of the state word. The length of one state word is set according to the content of the "tag" area. Namely, the length of the state word becomes variable depending on the content of the "tag" or which of the areas is included. Therefore, accesses must be made in various word lengths to the memory 12 for storing a state transition table, and the memory 12 must be accessible in various bus sizes. To enable accesses in various lengths (sizes), the size of a data bus is predefined, by way of example, for each memory space, and a state transition table including the state word having a corresponding word length is arranged in each memory space. In this way, an access size can be switched depending on an address when the state transition table is referenced.

In the above described structure of the state transition table, the "tag" area is always required in a state word. However, the state transition table may be structured not by arranging the "tag" area within a state word, but by storing the information indicating the length (size) of the state word. In this structure, the area configuration of a state word is determined in correspondence with each length. Or, a register is arranged for each length, and the content of the register is rewritten, so that the configuration corresponding to each length can be changed.

FIG. 12 shows the configuration in the case where the information indicating the length of a state word is included within the state word. The configuration shown in FIG. 12 is fundamentally the same as that in the case where the above described tag is included.

The configuration shown in this figure comprises a selector 150 and a temporary register 160. Respective elements structuring a state word, such as "input data", "state transition", "control word", etc., which configure a state word and correspond to the length within the state word, are read from the state transition table within the memory 120 to the temporary register 160 via the selector 150, and input to the arithmetic operation/output mechanism 140.

FIG. 13 shows the comparison between the case where a state word is structured as a fixed length and the case where a state word is structured as a variable length. FIG. 13A illustrates the case where the state word has a fixed length, whereas FIGS. 13B and 13C illustrate the cases where a state word is made variable by including within a state word the information indicating the length of the state word.

As described above, all of state words do not need to have information in all of the areas. Therefore, an unnecessary area including no data is generated in the case of the state word having the fixed length shown in FIG. 13A, leading to a decrease in storage efficiency.

In the meantime, an unnecessary area including no data is not generated in the case of the state word having the variable lengths shown in FIGS. 13B and 13C, leading to an increase in the efficiency of memory use. In the case of the configurations where the information indicating the length is included within a state word, which are shown in FIG. 13B or 13C, a variable length is implemented depending on a state word by predetermining that, for example, only a state word having "XX" is stored if the information indicating the length indicates one byte, a state word having "XX" and "YY" is stored if the information indicates two bytes, and the like.

Additionally, a state word may be configured in a way such that the information indicating the area configuration of a state word, such as the tag, the information indicating a length, etc. is not included within a state word. For instance, an address space may be allocated for each area configuration or for each length of a state word, and the area configuration of the state word can be learned according to the address at which the state word is accessed.

Furthermore, as another configuration, a state transition table can be implemented as 1-byte structure for one entry if a definition such that a state word accessed with 1-byte address always outputs byte-data is made. However, if the tag area is included in a state word in this case, both of 1-byte output data and a tag area are required within a state word. Therefore, one entry of the state transition table cannot be configured as 1 byte.

Still further, the tag or the information indicating a length is not included within a state word, a tag register for storing tag information may be arranged separately from the memory 12 shown in FIG. 4, and the area configuration of a state word may be stored in the tag register. This tag register is arranged, by way of example, for each length of a state word, and the content of each tag register is made variable, so that the area configuration of the state word can be changed.

The configuration, in which the information indicating a length is included within a state word, and, for example, the state word having "XX" is predetermined if the information indicating a length indicates 1 byte as shown in FIG. 13C, may be changed to a configuration including another type of information by arranging a tag register for each length of a state word and by rewriting the tag register.

FIG. 14 explains the case where a tag register is arranged for each length of a state word.

Figure 14A:
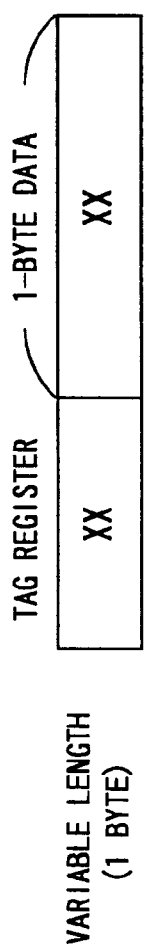
FIGS. 14A, 14B, and 14C explain the cases where a tag register is arranged for each length of a state word.
Figure 14B:
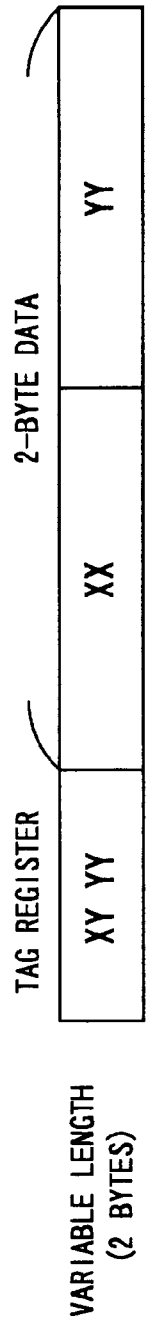

FIG. 14A shows a tag register for a state word having 1-byte length, whereas FIG. 14B shows a tag register for a state word having 2-byte length. Each state word is set in the tag register in these figures.

Figure 14C:
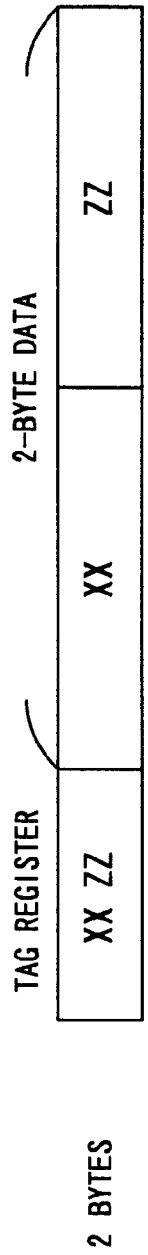

FIG. 14C shows a tag register for a state word having 2-byte length, similar to FIG. 14B. This figure shows that the configuration of the state word can be changed by altering the setting of the tag register, although its length is the same.

In FIG. 4, the state transition table is stored in the memory 12 within the finite state machine 10. Because the performance of the finite state machine depends on the time of an access to the state transition table, it is desirable to quickly make this access. However, a complex finite state machine requires a large state transition table. Therefore, the state transition table is stored in an external memory having a large capacity, and part of the table is cached inside the finite state machine, thereby speeding up the operations.

A pattern of an access to the state transition table depends on the configuration of the finite state machine. However, since the possibility of a state transition starting from a certain state is predictable to some extent based on past operational experiences, contents of a required state transition table can be cached in advance based on this prediction. Furthermore, the advance caching operations are embedded into the contents of a control word, so that the operations may be also scheduled intentionally.

Next, the operations of the search mechanism are explained. The search mechanism 13 shown in FIG. 4 searches the state transition table stored in the memory 12 by using the memory search value provided from the input conversion mechanism 11. As the simplest method making this search, there is a method with which, for example, the output of the input conversion mechanism 11 is added to the first address of the state transition table, and the entry within the state transition table, which corresponds to the next state, namely, the address of a state word, is obtained, thereby making the search. There is another method with which, for example, the first address of the state transition table is defined to be the power of 2 and is used as a base address, a search value is used as an offset address, and the base and the offset addresses are ORed to obtain an address.

FIG. 15 explains the operations of the search mechanism.

In this figure, the state transition table of a current state, or the state transition table indicated as a state transition destination by the state word of the current state is accessed by using the arithmetic operation result in the current state and/or a search value based on input data as an index, so that the next state word is obtained. As a simple method obtaining this state word, there is a method obtaining the address, for example, by merely adding the index to the first address of the state transition table.

Normally, there are a wide variety of memory search methods. A method using an associative memory (content addressable memory (CAM)) for speeding up a search, or a method using hardware for a search may be used. In this preferred embodiment, any memory search methods are available.

FIG. 16 exemplifies a search in a state transition table. In this figure, a state transition table 25 corresponds to the first input data 24. Assuming that data X for a memory search, which is included in the input data 24, is 8 bits, the state transition table 24 have entries the number of which is 256 ($=2^8$). The contents of the 8 bits are added unchanged, for example, to the first address of the state transition table 25, and one entry, that is, a state word 26 is searched. The state word stores the "state transition", namely, the first address of the next state transition table as explained by referencing FIG. 11. With this address, a second transition state table 28 is settled, and processes such as an arithmetic operation for the input data are performed according to the contents of a control word.

When the next input data 72 is provided, one entry, that is, a state word 29 is searched with memory search data such as Y, and the processes are performed for the input data 27 in a similar manner.

In FIG. 16, all of the 8 bits in the memory search data included in the input data are used unchanged to search for one state word within the state transition table. However, by converting the memory search data into a fewer number of bits such as 4 bits with the input conversion mechanism 11 as described above, the state transition table is configured to have a fewer number of entries such as 16 entries.

Here, the data processing and the state transition in this preferred embodiment are explained by using a specific example. Suppose that (A·B)+C is calculated with three pieces of input data A, B, and C, which are provided on the first to the third cycles in this order.

On the first cycle, for example, a memory search value having a fewer number of bits is obtained from memory access data within the input data by the input conversion mechanism 11, and a state word is read from a first state transition table by using this value. This state word designates the operation for storing A as the input data, for example, in a register within the data processing device. The input data A is therefore stored in the register on the first cycle, and at the same time, the first address of the second state transition table for obtaining the product of the data A and the data B input on the next cycle, that is, the second cycle is acquired.

On the second cycle, for example, memory access data within the input data is converted into a search value in a similar manner, and the state word at the position, which is obtained by adding the search value and the first address of the second state transition table, is read. According to this read state word, the data A stored in the register and the input data B are settled to be multiplied, and the result of this multiplication is again stored in the register.

On the second cycle, the first address of a third state transition table storing the state word for adding the data C input on the third cycle to the value stored in the register is obtained simultaneously. On the third cycle, the state word within the third state transition table is read similar to the first and the second cycles, and the value resultant from the multiplication of A and B, which is stored in the register, and the input data C are added.

In the above described specific example, the processes performed in the respective cycles are settled, and also an execution order is fixed. Therefore, the process for obtaining a search value from input data is not actually performed, and the first address of each state transition table is used unchanged as the address of a state word to be read.

Turning back to the explanation of the constituent elements shown in FIG. 4. The operations of the arithmetic operation/output mechanism 14 are described next. The arithmetic operation/output mechanism 14 performs an arithmetic operation for input data, and outputs a result of the operation according to the contents stored in the "control word" area in a state word within the state transition table. The reason that the arithmetic operation/output mechanism 14 is comprised is to implement processes that cannot be realized only with a pure finite state machine, or to speed up performance. Various arithmetic operation/output processes are considered as the above described processes in consideration of processes for stream data. A floating-point arithmetic operation is its best example.

In the arithmetic operation/output mechanism 14, a plurality of arithmetic operation circuits can be operated at the same time. For instance, a CRC (Cyclic Redundancy Check) calculation is performed as an error detection process while calculating the number of pieces of input data, and a process for externally transferring output data is performed in parallel, so that the processing speed can be made faster than that implemented by sequential processing with software.

Figure 17:
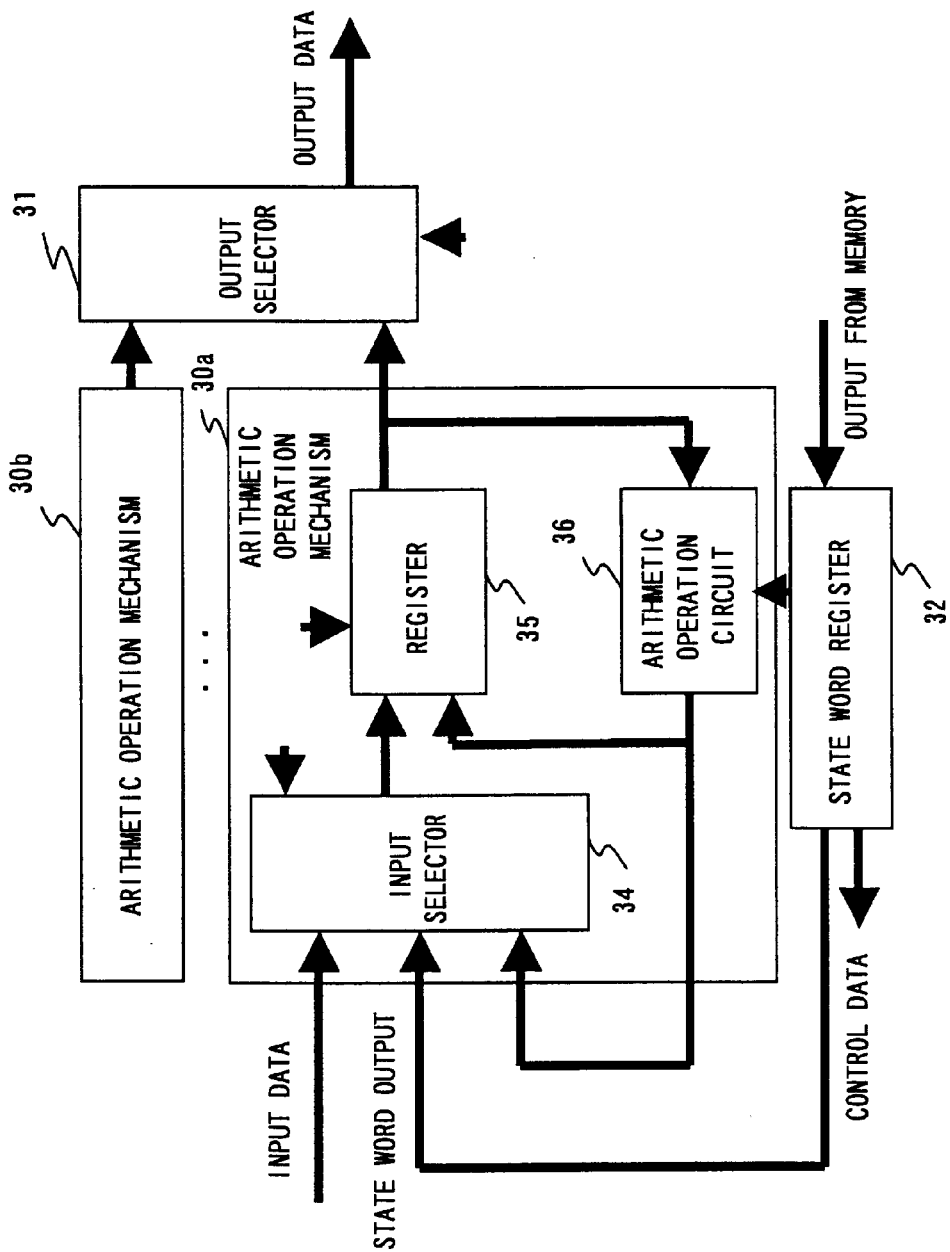
FIG. 17 exemplifies the configuration of an arithmetic operation/output mechanism.

FIG. 17 exemplifies the configuration of an arithmetic operation/output mechanism. In this figure, the arithmetic operation/output mechanism comprises a plurality of arithmetic operation mechanisms 30a, . . . 30b, and an output selector 31 for selecting the outputs from the arithmetic operation mechanisms and for using a selected output as the output of the finite state machine 10. The arithmetic operation mechanisms 30a, . . . 30b and the output selector 31 are controlled according to control data (indicated by unconnected arrows) output from a state word register 32 for storing a state word. To the arithmetic operation mechanisms, for instance, input data, contents of a state word such as a control word, which are output from the state word register 32, an output of an arithmetic operation circuit included within each of the arithmetic operation mechanisms, and the like are input. Such a configuration and the connections between the constituent elements are changed depending on need, and the preferred embodiment is not limited to the configuration shown in FIG. 17 as a matter of course.

In FIG. 17, each of the arithmetic operation mechanisms 30a, . . . 30b is composed of an input selector 34, a register 35, and an arithmetic operation circuit 36. The register 35 is a memory for storing a plurality of pieces of arithmetic operation data required for an arithmetic operation, and stores input and output data, etc. depending on need. Other than a simple memory, a FIFO memory, a counter, an accumulator, a comparator, a shifter, an endian converter, a bit assignment converter, or a code converter, etc. are sometimes used as the register. However, whether these units are implemented either as a register or as an arithmetic operation circuit is amounting problem. Therefore, this preferred embodiment does not particularly impose a limitation.

The arithmetic operation circuit 36 is a circuit which performs a predetermined arithmetic operation, and an arithmetic operation type depends on an assumed application. For a numerical value calculation, the arithmetic operation type is a numerical value operation such as an integer operation, a floating-point operation, etc. For signal processing, a multiplication/addition operation, a Fourier transform, etc. For communication processing, a CRC calculation, an IP checksum calculation, etc. The IP checksum calculation is the checksum calculation of an Internet Protocol header. With the checksum calculation, a header is recognized as a sequence of 16-bit words, their sum is calculated with 1's complement, and the resultant one's complement is recognized as a checksum.

Additionally, for an encryption process as an arithmetic operation type, a DES (Data Encryption Standard) operation, an MD 5 operation, etc. exist. The MD5 is intended to authenticate Internet data for security. With the MD5, code that is obtained by calculating a special mathematical expression with hash data in correspondence with transmission data is transmitted with the data, and the transmission data is compared with the hash data extracted with the same method on a receiving side, so that data security is ensured. In this preferred embodiment, the arithmetic operation performed by the arithmetic operation circuit 36 is not particularly limited, and a general configuration in which any type of an arithmetic operation can be implemented may be used.

FIG. 18 exemplifies the configuration of such a general arithmetic operation circuit in this preferred embodiment. In this figure, the arithmetic operation circuit 36 is composed of a plurality of registers 38a, . . . 38b, and a logic circuit 39. Control input to the arithmetic operation circuit 36 is directly provided from the state word register 32 shown in FIG. 17, and the output of the arithmetic operation circuit 36 is stored in the register 35. Additionally, an arithmetic operation result output is, for example, data provided to the input conversion mechanism 11 explained by referencing FIG. 4, such as a hash value required for converting input data into a memory search value.

The arithmetic operation circuit is controlled according to the contents of a control word in a similar manner as in a microprogramming method. Accordingly, if a control word that can simultaneously control a plurality of arithmetic operations is used, a plurality of processes can be executed for one input data at the same time. FIG. 19 exemplifies a counter circuit as such an arithmetic operation circuit that simultaneously executes a plurality of processes.

In this figure, the arithmetic operation circuit is composed of a plurality of counters 40a, . . . 40b, and a selector 41. Each of the counters is preset by input data, and can perform its count operation and output an arbitrary count value via the selector 41 according to the contents of a control word. By suitably configuring the contents of a control word, the plurality of counters can be controlled simultaneously.

Figure 20:
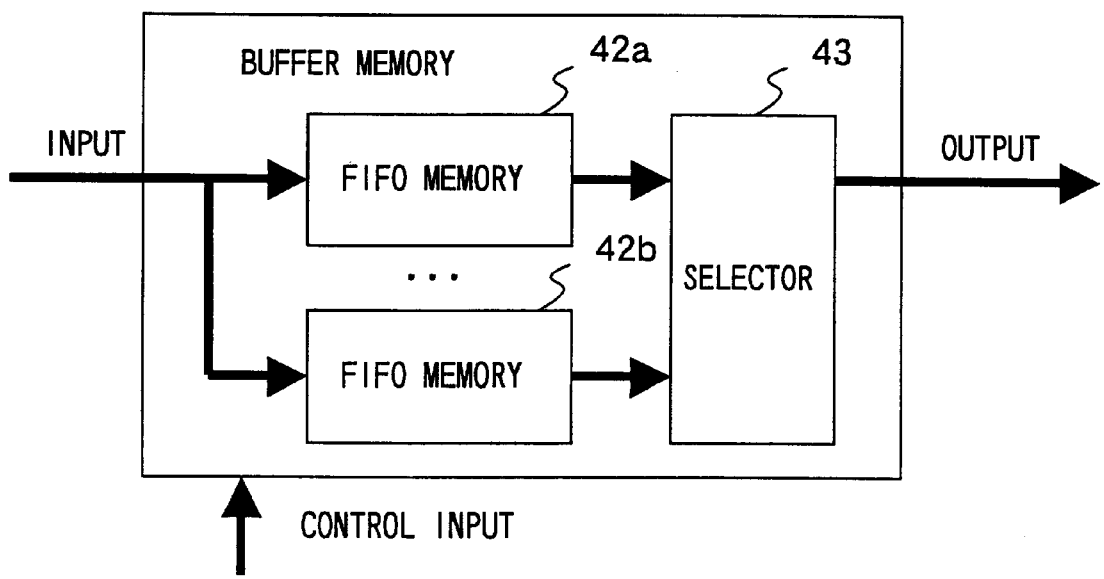
FIG. 20 exemplifies the configuration of a buffer memory as an arithmetic operation circuit.

Also a FIFO memory can be used as one type of the arithmetic operation circuit. For example, in processes such as packet encapsulation for making a communication by burying an Internet Protocol version 4 (IPv4) packet in an IPv6 packet, or an error code checking, etc., their results cannot sometimes be output until entire stream data is checked. In such a case, data of the whole of one packet must be stored until input stream data is externally output. Therefore, in this preferred embodiment, a FIFO memory is prepared as a buffer memory, and the data for one packet is temporarily stored until the entire stream data can be output. FIG. 20 shows the configuration of such a buffer memory, which is composed of a plurality of FIFO memories 42a, . . . 42b, and a selector 43.

A method implementing a logic circuit corresponding to an arithmetic operation circuit by using a table such as a lookup table (LUT) is widely known. Such a table can be implemented as an arithmetic operation table similar to the state transition table according to this preferred embodiment. In this case, a state word is composed of a tag and an output, and input data is a data for which an arithmetic operation is to be performed.

In such a case, whether the logic circuit is implemented either with hardware dedicated to an arithmetic operation circuit or with a table depends on an object of an implementation, etc. Depending on an object, a very large table including 10,000 entries or more, such as a routing table used for a communication process is required. In this case, the mechanism for searching a large table, which is comprised inside or outside the data processing device, must be arranged as an arithmetic operation circuit.

FIG. 21 exemplifies the configuration of such a table search mechanism. This table search method is almost the same as that for a state transition table, which is explained by referencing FIG. 15. That is, one entry within a table is searched with an address obtained by means of a synthesis, for example, an addition of the current address indicating the first address of one table stored in an external memory and the memory search value corresponding to input data. At this time, the first address of the next table (next address) can be obtained if necessary.

If an arithmetic operation/output mechanism is implemented with this table search mechanism, input data is partitioned into one or a plurality of areas by controlling a slider, etc. depending on the value set in the "input" of a state word within a state transition table, so that the table is sequentially searched with the data within the respective areas.

Figure 22:
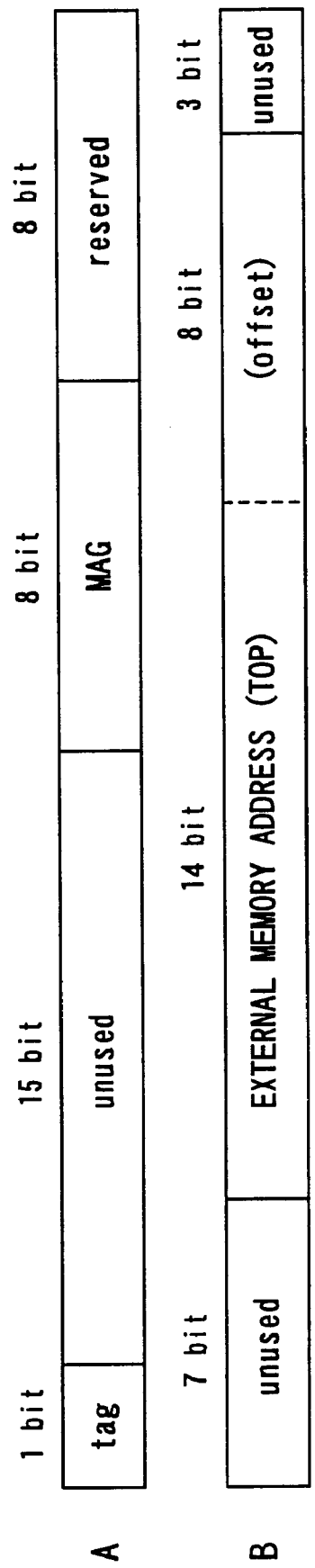
FIG. 22 exemplifies control registers for the table search mechanism.

FIG. 22 exemplifies a control register for searching the table shown in FIG. 21.

The register shown in this figure assumes 32-bit registers. A tag and an MAG pattern are set in an A register, whereas an external memory address (TOP) and an offset are set in a B register.

The tag is intended to specify whether or not to use the A and the B registers so as to control the table, or whether or not to use these registers for another purpose, such as a control performed when an external memory is used as a ring buffer. The MAG pattern is similar to the above described MAG pattern for a state transition table. This is a mask pattern performing the MAG process for input data. One entry within the table is specified by an address obtained by adding the result of the MAG process, the external memory address TOP and the value of the offset value.

The arithmetic operation circuit using this table is used, for example, to attach a header to an adequate position of an output packet by presetting a fixed packet header output in this table.

As described above, in the finite state machine, in principle, a transition to the next state is not made until an arithmetic operation started in correspondence with a certain state is completed, and the processing performance of an arithmetic operation circuit has much influence on the performance of the finite state machine. However, a result of the process performed by an arithmetic operation circuit is not immediately required in some cases depending on the contents of a process. In such a case, it is more efficient to make a transition to the next state even if an arithmetic operation is not completed.

For example, in an encryption process, if the DES operation is performed for input stream data and its result is output, it is not used within the finite state machine itself. Therefore, the operation may be performed by sequentially providing on successive cycles input data for which the DES operation is to be performed. However, since the DES operation is performed for a plurality of successive pieces of data, this state remains unchanged as the DES operation even if a transition is made to the next state upon completion of one DES operation.

FIG. 23 is a block diagram showing the configuration of a DES operation circuit in which a FIFO memory is arranged in a data inputting unit so as to successively perform the DES operation as described above. In this figure, the DES operation circuit is composed of a FIFO memory 45 for writing input data, a register 46 for storing a DES key, a register 47 for storing a DES mode, a DES core operation unit 48, and a FIFO memory 49 on an output side. The FIFO memory 45 on the input side is intended to write input data with no wait time as far as this memory has an empty space. In the meantime, the FIFO memory 49 on the output side is intended for a finite state machine, which outputs data when detecting that data is stored in this memory. The configuration of such an arithmetic operation circuit, which is not limited to the DES, achieves an effect such that the throughput of a finite state machine is prevented from being degraded in the case where the throughput is almost the same as or faster than the speed of input stream data on average although it is inconstant.

Furthermore, as an example of an arithmetic operation circuit, there is a pattern processing circuit using a pattern memory. By way of example, the header of a communication packet is composed of some areas, and their values have a correlation. The header of an IPv4 packet is shown in FIG. 24. In this figure, the portion up to a destination address is the header. In the data processing device according to this preferred embodiment, an arithmetic operation/output mechanism which uses as input data data the format of which is widely used as the Internet Protocol and settled, and analyzes the structure of the data is implemented with a pattern processing circuit.

FIG. 25 is a block diagram exemplifying the configuration of such a pattern processing circuit. In this figure, the pattern processing circuit is composed of a plurality of registers 50a, 50b, . . . 50c, and a pattern processing unit 51. The pattern processing unit performs a process for data having a settled data structure. In the arithmetic operation/output mechanism implemented by the pattern processing circuit, input data is divided based on the value set in the "output" of a state word, and sequentially stored in the plurality of registers 50. Upon terminating the storage of the divided data in the registers 50, the pattern processing unit 51 examines whether or not the input data matches an assumed data structure, changes the contents of a particular area (register) within the data structure, extracts particular data, and performs an arithmetic operation for part of the data.

The configuration of the pattern processing unit 51 depends on an object. Fundamentally, however, the pattern processing unit 51 can be implemented with a logic circuit.

As a modification of the pattern processing circuit, a profile generation circuit, namely, a profiler exists. The profiler is intended to generate the information (profile) indicating the characteristic of a series of stream data. For example, as shown in FIG. 24, the header of the IPv4 packet has a data structure composed of a plurality of words fields, and the packet can be identified as the IPv4 packet by examining all of the areas fields. Once the data structure is determined, a packet can be thereafter identified, for example, with 1-byte code indicating the predefined IPv4 by attaching this code as a profile.

Such a profile process can be performed also with a general-purpose arithmetic operation circuit. However, a high-speed process can be enabled by preparing beforehand an arithmetic operation circuit dedicated to a frequently used data structure such as the IPv4 packet.

Inside the arithmetic operation/output mechanism, an MAG processing unit which performs, for example, the MAG process explained by referencing FIG. 10 may be arranged. The MAG processing unit within the input conversion mechanism is used to obtain a memory search value for searching a memory in which a state transition table is stored. In the arithmetic operation/output mechanism, for instance, an LUT is sometimes used as a replacement of a logic circuit as explained by referencing FIG. 2. In such a case, an access to the table can be made faster by obtaining a search value having a fewer number of bits at the stage of an arithmetic operation and by using the search value for a search. The MAG process is effective for obtaining this search value.

Next, series or parallel processing of the data processing device, which is intended to implement a complicated process, is explained. For instance, an IP packet process is normally a complicated process. By way of example, an IP checksum must be calculated after the contents of an IP header are settled, and in packet encapsulation, the IP checksum must be simultaneously calculated while changing the contents of the IP header. In such a case, a necessary process may be implemented by using a working register in an intermediate manner and by using a plurality of cycles. This method, however, causes a larger delay and degradation of throughput.

Figure 26:
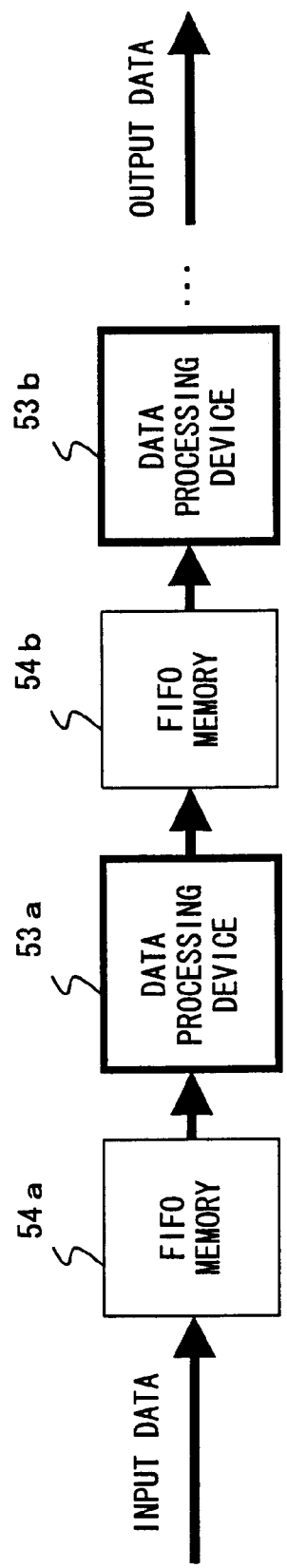
FIG. 26 exemplifies the configuration of a system in which data processing devices are connected in series.

One solution for efficiently performing such a complicated process is a configuration such that data processing devices are connected in series to perform pipeline processing. FIG. 26 explains such a pipeline configuration. In this figure, a plurality of data processing devices 53a, 53b, . . . are connected in series respectively via FIFO memories 54a, 54b, . . . If the above described packet process is performed in the configuration shown in this figure, the data processing device 53a in the first stage converts an IP header, and the data processing device 53b in the second stage calculates the IP checksum. Since the data processing devices 53 run quite independently, they may be connected in series also in a mechanical manner. If the capacity of hardware permits, it is desirable to adopt such a pipeline configuration.

Next, the system configuration for improving the data processing capability by operating a plurality of data processing devices in parallel. FIG. 27 exemplifies such a parallel configuration. This example assumes that all of data processing devices synchronously run at the same processing speed, and to implement this, FIFO memories 56 and 57 are respectively arranged on the input and the output sides of each of the data processing devices connected in parallel.

If the speeds of some of the data processing devices connected in parallel are different, signals must be exchanged to synchronize their operations. To synchronize the operations of the data processing devices, FIFO memories are arranged on the input or the output side of some of the data processing devices, and the devices are synchronized, for example, with a method similar to that establishing the synchronization between the above described input conversion mechanism and the arithmetic operation/output mechanism that requires a long time to perform its process.

Furthermore, if the processing speed of each of the data processing devices that run in parallel is different, FIFO memories must be arranged on both of the input and outputs side of each of the devices. Such a parallel configuration is shown in FIG. 28. In this figure, FIFO memories 56a, . . . 56b and 57a, . . . 57b are respectively arranged on the input and the output sides of data processing devices 55a, . . . 55b, which are arranged in parallel. In this figure, control must be performed to establish the synchronization between an input data read operation and a data output operation. Also this control can be implemented with the same method as that synchronizing the arithmetic operations of the arithmetic operation mechanisms that run at different speed, as described above.

As stated earlier, in the system where a plurality of data processing devices are connected in series or in parallel, the operations of the data processing devices must be synchronized in some cases. FIG. 29 exemplifies the parallel configuration of data processing devices, in which a synchronization circuit for synchronizing the operations of the data processing devices is included. In this figure, although the system configuration itself is the same as that shown in FIG. 27, a synchronization circuit 61 is arranged to synchronize the operations of the data processing devices 58a, . . . , 58b. The operation states of the data processing devices are collected in the synchronization circuit 61, whose output is then provided to the respective data processing devices 58 as an input, so that the data processing devices 58a, . . . , 58b can perform their operations in synchronization.

Furthermore the system where a plurality of data processing devices are connected in series also can have the synchronization circuit.

Next, a multiplexed stream data process is explained.

If a plurality of devices (units) are interconnected by a shared bus such as a computer bus, and if data is transferred between the devices (units) by using this shared bus, a plurality of pieces of independent stream data are multiplexed and transferred in many cases.

With the data processing device according to this preferred embodiment, a mechanism for identifying independent data within multiplexed data is arranged to process such multiplexed and transferred data. If a plurality of pieces of independent stream data are multiplexed and transferred, the independent stream data corresponding to respective data processes are identified within the multiplexed data with this identification capability. Then, the identified data are respectively input, for example, to the data processing devices that are connected in parallel and explained by referencing FIG. 28, so that the multiplexed stream data can be processed.

Figure 30:
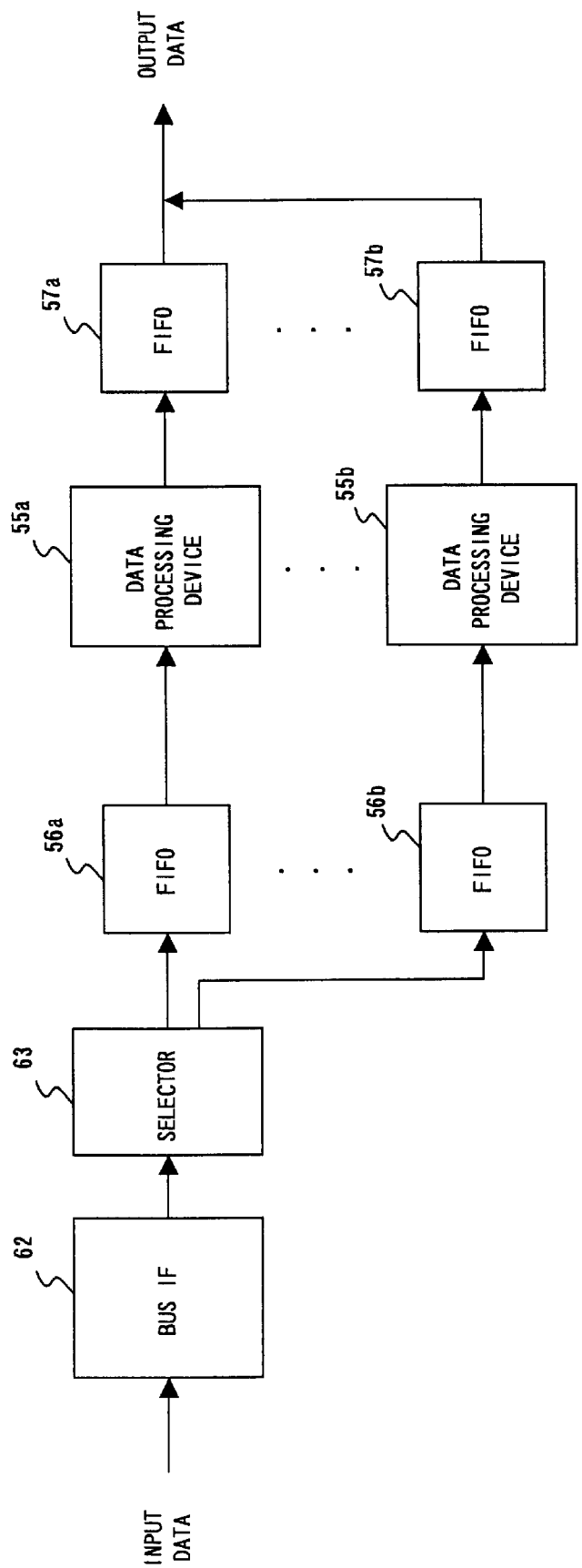
FIG. 30 exemplifies the configuration of a system comprising a multiplexed data identification mechanism.

FIG. 30 exemplifies the configuration of a system including such a mechanism for making identification within multiplexed data. In this figure, a selector 63 is newly arranged as the identification mechanism in the configuration shown in FIG. 28.

The selector 63 identifies the data corresponding to the data processing devices 55a, . . . 55b within multiplexed data on the shared bus, which is input via a bus interface 62, and outputs the identified data to the FIFOs 56a, . . . 56b corresponding to the data processing devices 55a, . . . 55b.

As an identification method executed by the selector 63, various methods are considered. For example, a method allocating an address space or an IO space to each device (unit) interconnected by a computer bus (shared bus), a method making identification according to the contents of data (contents of data at a particular location), and the like are considered.

If identification is made by using an address space, for instance, the address space of a computer bus is partitioned into a plurality of areas and allocated to devices beforehand, and the selector 63 identifies multiplexed data depending on which of the areas the destination address of transfer data belongs to.

Lastly, specific application examples of the data processing device according to this preferred embodiment are explained. An ASCII code conversion process as a first application example is shown in FIG. 31. This example assumes that byte data of an input stream is handled as ASCII code, and uppercase letters are converted into lowercase letters. In this case, the stream processor comprises an ASCII code conversion table 70. This conversion table is searched each time one character is input, and its result is output. ASCII code is 7 bits, and the conversion table 70 has 128 entries.

FIG. 32 shows a state machine that indicates a state transition in the first application example. The state machine for the ASCII code conversion has only one state, and a finite state machine executing this process becomes a machine whose inputs and outputs are ASCII code. The ASCII code conversion table 70 represents one state, and entries therein respectively indicate the operations of the finite state machine, which correspond to input characters. It is proved from this figure that the finite state machine which can change the contents of a process can be configured by using a simple LUT in this example. Accordingly, the data processing device can be implemented as a configuration including the ASCII code conversion table as one state transition table (LUT). This state transition table, namely, the LUT has 128 entries, and its output is 7-bit ASCII code. Since this data processing device has only one state, its state does not make a transition. The processing performance of this data processing device fundamentally depends on the access performance of the LUT. Furthermore, the LUT is configured by a small-scale and high-speed memory.

Next, packet labeling is explained as a second application example. A packet labeling process is slightly more complicated than code conversion. With this process, the contents of an input packet are analyzed, the contents of a label are determined based on the result of the analysis, and the label is attached to the beginning of the packet, which is then output. The packet labeling is also referred to as tagging. Naturally, there is also the process for detaching part or the whole of a label or a header as a conversion process inverse to the label attachment process. Here, these processes are collectively referred to as the packet labeling process, which is essential in almost all packet communication processes.

FIG. 33 explains the packet labeling process. For this process, the time for analyzing the contents of a header, and the time for generating a label as new data and for attaching the label to the beginning of an input packet are required. Here, a time longer than the transfer rate of an input packet is normally required to analyze the contents of a header. Therefore, an analysis/label generation processing unit shown in FIG. 33 performs an analysis and label generation by using a table search mechanism 80. An input packet is stored in a FIFO memory 81 during that time. Upon completion of the label generation, a label is output from the analysis/label generation processing unit, and attached to the input packet stored in the FIFO memory 81 as a new label, so that an output packet is obtained.

Such packet labeling includes all of the fundamental capabilities in a packet communication process. For instance, in Internet Protocol packet routing, after the header of a packet is analyzed, its TTL (Time To Live) field is rewritten, the address of the next transfer destination is written to a label, and the packet is transferred.

In the TTL field, a time required until a packet is received on a receiving side is predicted and set by a transmitting side of the packet. In a partway IP module being a gateway, the time taken for a packet transfer process is subtracted from the value within the TTL field. If the process time cannot be measured, at least 1 is subtracted from the TTL value. When a packet whose TTL value is 0 is detected in a partway IP module, this packet is discarded.

As an example of more complicated packet labeling, IPsec (Security Architecture for the Internet Protocol) exists. By way of example, with the ESP (Encapsulated Security Payload) stipulating a method which encapsulates and tunnels data, part of an input header is rewritten, and at the same time, the data is encrypted/decrypted, a new header (label) is attached, and the data is inversely converted. Naturally, also the IP checksum must be changed because the header is rewritten. To implement such a complicated process, use of a simple FIFO memory as shown in FIG. 33 is insufficient, and a system where a plurality of stream processors run with pipeline processing becomes necessary.

Explained next is the case where the data processing device according to this preferred embodiment is configured as a stream processor.

FIG. 34 shows an example where the data processing device according to this preferred embodiment is configured as a stream processor processing IP packets.

In the stream processor shown in FIG. 34, input data (stream data) removed from an input queue is input to an Indexer 95 via an Input Slider 92, an Input SELctor 93 and a PS SELector 94.

The Indexer 95, a State Table Access 96 and a State Transition Table 97 respectively correspond to the input conversion mechanism 11, the search mechanism 13 and the state transition table 12, which are shown in FIG. 4. The Indexer 95 generates an STT index for referencing the State Transition Table 97 according to input data. The state Table Access 96 reads from the State Transition Table 97 the state word at the position of an STT address obtained from the STT index, and sets the read word in a State Control Register 98.

The Indexer 95 generates an STT index depending on a state in order to analyze packets in various formats. The SST index is generated, for example, by extracting a necessary portion from input data with an MAG operation based on the setting in the State Control Register 98.

The units within the stream processor are controlled based on the values of the state word set in the State Control Register 98. By way of example, the Input Slider 92 and the Input SELector 93 are controlled based on the "input" area of the state word. The Indexer 95 is controlled based on the "state transition". An Accumulator 99, a Table or Buffer 100, an IP Checksum operation unit 101, and a DES operation unit 102 are controlled based on the "control word". An Output SELector 103 and an Output Slider 104 are controlled based on the "output".

The accumulator 99, the Table 100, the IP Checksum operation unit 101, the DES operation unit 102, the Output SELector 103 and the Output Slider 104 correspond to the arithmetic operation/output mechanism 14 shown in FIG. 4. Additionally, the Accumulator 99 corresponds to the arithmetic operation mechanism 30 typified, for example, by the configuration shown in FIG. 18, the Table 100 corresponds to the table search mechanism typified, for example, by the configuration shown in FIG. 21, the IP Checksum operation unit 101 corresponds to the arithmetic operation circuit typified, for example, by the configuration shown in FIG. 19, and the DES operation unit 102 corresponds to the DES operation circuit typified, for example, by the configuration shown in FIG. 23. Input data are processed by these operation units based on the value set in the "control word" area of a state word, and one of the outputs of the operation units is selected and output from the Output SELector 103 based on the value set in the "control word".

Furthermore, a Mode 91 is a register set from a Control Processor Bus, and various operation mode types such as run mode, error mode, etc. of the stream processor are set. The PS SELector 94 controls the input to the Indexer 95 based on the setting of the Mode 91.

FIG. 35 explains the operations performed by the Input Slider 92 and the Output Slider 104.

The Input Slider 92 is a mechanism for selecting and outputting a plurality of bytes within input stream data as a target to be processed by the stream processor.

Normally, stream data has diversified data structures, and is not aligned by the internal processing word length of the stream processor, such as 32 bits, 64 bits, etc. Therefore, the stream processor aligns the data to be processed with the Input Slider 92.

In this figure, the first 1-byte data D0 within input data is processed in the initial state. Then, the Input Slider 92 slides the input data by 1 byte, and D1 to D8 are targeted for the process in this state. After D1 and D2 are processed in this state, the Input Slider 92 slides the input data by 2 bytes. In this state, D3 through D10 are targeted for the process. Slide control such as specifying the number of bytes to be slid, etc. by the Input Slider 92 is performed depending on the setting in the "input" area of a state word.

When no stream data is left, the Input Slider 82 resets a flag to 1, and stops its operations. By examining this flag, the stream processor can learn the end of stream data.

Likewise the Input Slider 92, the Output Slider 104 aligns the output of the Output SELector 103 based on the value set in the "output" of the state word, and provides the aligned output to an Output Queue.

Figure 36:
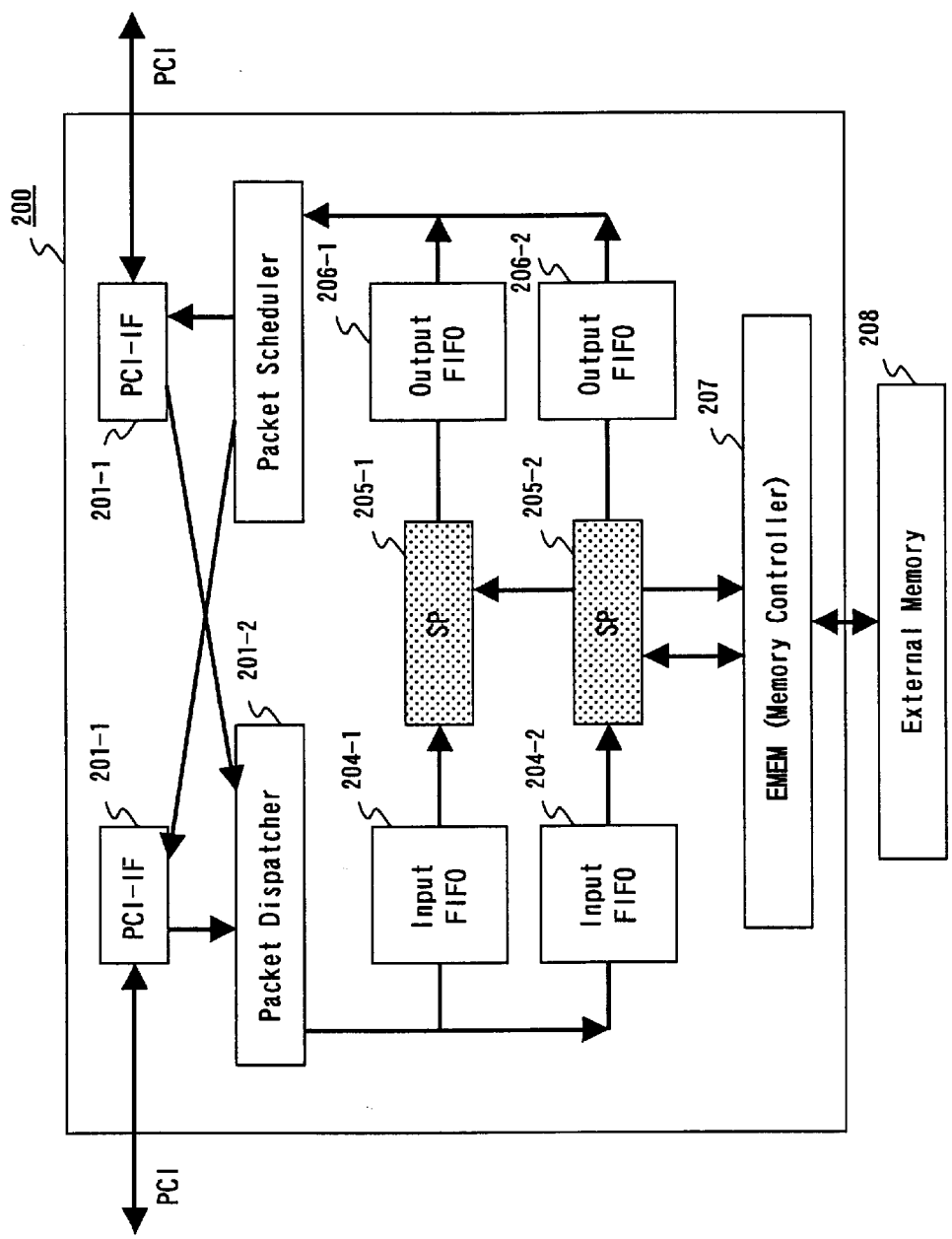
FIG. 36 exemplifies the configuration of a network processor using a stream processor shown in FIG. 34.

FIG. 36 exemplifies the configuration of a network processor using the stream processor shown in FIG. 34.

A network processor 200 shown in this figure is intended to process multiplexed stream data which flows on a PCI bus, and comprises PCI bus interfaces 201, a Packet Dispatcher 202, a Packet Scheduler 203, and a Memory controller 207 in addition to two combinations of an INPUT FIFO 204, a Stream Processor 205, and an Output FIFO 206.

The two PCI bus interfaces 201-1 and 201-2 are exactly the same in terms of their capabilities. The Packet Dispatcher 203 is a module for storing the data transferred from the PCI bus in the Input FIFOs 204.

From the PCI bus, multiplexed data is transferred in short bus transactions. In the meantime, the stream processor 205 assumes to sequentially process stream data. Therefore, the Packet Dispatcher 202 stores the non-stream multiplexed data transferred from the PCI bus in the Input FIFO 204 in units of packets, and passes the data to the stream processor 205.

The Packet Dispatcher 202 is a mechanism for storing the data transferred from the PCI bus interface 201 in the Input FIFO 204 within the stream processor 205. Data having a PCI address where all of low-order 16 bits are 0 is identified as the beginning of a packet, and data at addresses succeeding the identified data are regarded as data included in the packet. The Packet Dispatcher 202 recognizes the end of stream data upon receipt of the next packet (data having a PCI address where all of low-order 16 bits of are 0), or according to an external instruction.

The Packet Scheduler 203 is a mechanism for transferring the data of the Output FIFOs 206-1 and 206-2, which correspond to the stream processors 205-1 and 205-2, to the PCI bus. The Packet Scheduler 203 transfers data within a specified area to the PCI bus interface 201 as far as the data is left in the Output FIFO 206.

Input FIFO 204/Output FIFO 206 is an input/output queue of each of the stream processors 205, and a plurality of FIFOs are prepared for each of the stream processors 205.

The Memory Controller 207 is a controller when a network processor 200 accesses the external memory 208. The external memory 208 stores a table, etc.

Figure 37:
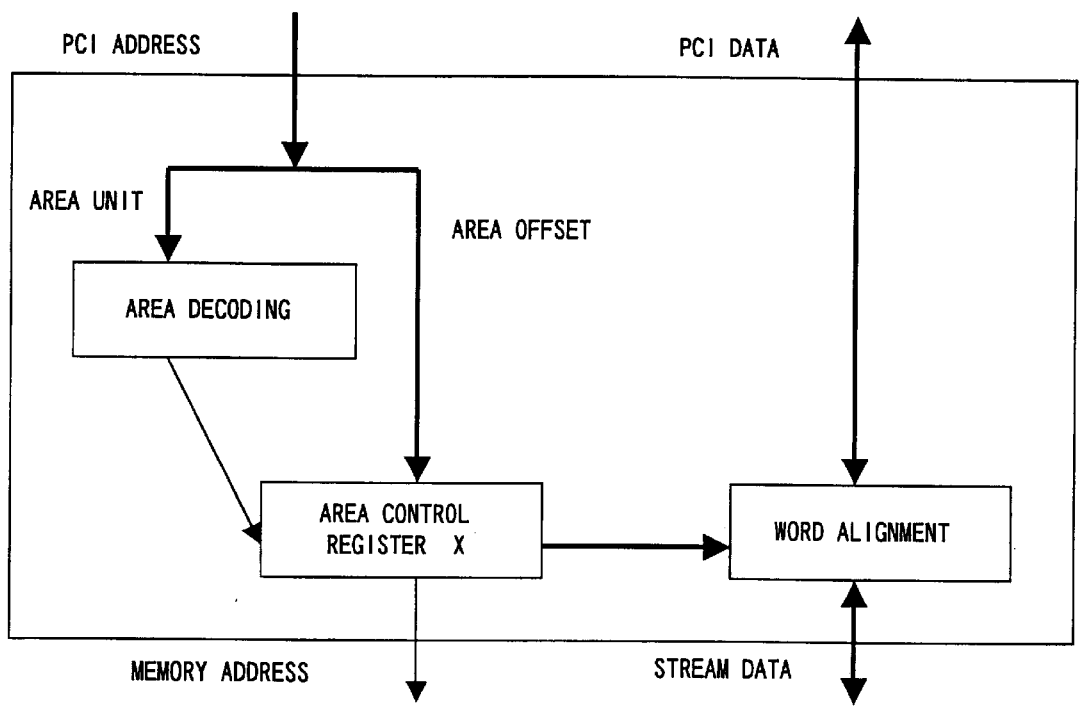
FIG. 37 explains a multiplexed stream data identification process performed by the network processor.

FIG. 37 explains the process for making identification within multiplexed stream data, which is performed by a network processor.

In the network processor, the stream data transfer between a PCI bus and the inside of the network processor is as the transfer to a queue (Input FIFO 204/Output FIFO 206) specified with an address area.

Areas into which an address space is partitioned are respectively allocated to respective queues, and the network processor makes identification within multiplexed data by recognizing the high-order portion of an PCI address of multiplexed data as an area portion, and by decoding the area portion, and transfers the identified data to corresponding queues. Additionally, if the offset of an area in an Input/Output Queue area is 0000H, the network processor recognizes the data transferred at this time as the beginning of the packet (stream data). Namely, data preceding this data is recognized to be a different packet (stream data) even if the preceding dta belongs to the same area.

As described above in detail, according to the present invention, a data processing device is configured by arranging a memory for storing a state transition rule, so that general-purpose processes such as a stream data process, etc. can be executed at high speed, and a process capability can be easily changed by altering the contents stored in the memory. Furthermore, a FIFO memory, a register, and respective types of arithmetic operation circuits are used, so that diversified processes can be implemented, and the data processing device is available as a general-purpose processor.

Additionally, according to the present invention, an access to one state word within a state transition table enables data input, analysis, state transition, execution of a plurality of arithmetic operations and data output, and a processing speed is therefore stipulated by the performance of an access to the state transition table. With the recent VLSI technology, 100-MHz or faster processing performance can be implemented. Additionally, high-speed processing can be realized at low cost in comparison with the case where software and an expensive high-speed processor are used. This greatly contributes to an improvement in the fundamental performance of the data processing device.

What is claimed is:

1. A data processing device using a table, comprising:
    an input converting unit obtaining memory search data from input data;
    a memory searching unit searching, based on the memory search data, a state transition table storing as an entry a state word which designates a preset process, and reading the state word corresponding to a process performed for the input data, said input converting unit determining a method of obtaining subsequent memory search data from subsequently input data, based on the state word;

an arithmetic operation unit determining the preset process performed for the input data based on contents of the state word read by said memory searching unit, and performing the preset process.

2. The data processing device using a table according to claim 1, wherein said arithmetic operation unit obtains access information to the state transition table corresponding to the preset process to be performed next based on the contents of the read state word.

3. The data processing device using a table according to claim 1, further comprising a state transition table rewriting unit changing contents of the state transition table before the preset process is executed.

4. The data processing device using a table according to claim 1, further comprising a state transition table rewriting unit changing contents of the state transition table while the preset process is executed.

5. The data processing device according to claim 1, wherein the state word includes at least one of a search data pattern that said memory searching unit uses to select the state word, access information for a next state transition, control information indicating contents of the preset process performed for the input data, output information about output data, and tag information indicating a configuration of the state word.

6. The data processing device using a table according to claim 5, wherein the tag information is information indicating whether or not the search data pattern, the access information, the control information and the output information are included in the state word.

7. The data processing device using a table according to claim 5, wherein the state word always includes the tag information.

8. The data processing device using a table according to claim 5, wherein the state word does not include the tag information, and a length of the state word indicates the configuration of the state word.

9. The data processing device using a table according to claim 8, further comprising a register storing information indicating a configuration of the length of the state word for each length of the state word.

10. The data processing device using a table according to claim 1, wherein said input converting unit obtains from the input data the memory search data having bits a number of which is fewer than the input data.

11. The data processing device using a table according to claim 10, wherein said input converting unit extracts a plurality of bits at arbitrary positions within the input data, and obtains the memory search data with a mask and gather process for gathering the extracted bits.

12. The data processing device using a table according to claim 1, wherein said memory searching unit reads a state word at a position obtained by synthesizing the input data and a base address of a memory, and uses access information as a base address in a next memory search if the read state word includes the access information for a next state transition.

13. The data processing device according to claim 1, wherein said memory searching unit obtains an address of a state word to be read by synthesizing the memory search data with a base address of a memory, and uses access information as a base address in a next memory search if the read state word includes the access information for a next state transition.

14. The data processing device using a table according to claim 1, wherein said arithmetic operation unit comprises
a register unit; and
an arithmetic operation processing unit performing an arithmetic operation for the input data by using said register unit.

15. The data processing device using a table according to claim 1, wherein said arithmetic operation unit has a FIFO memory unit which delays an output until an arithmetic operation for the input data is completed.

16. The data processing device using a table according to claim 1, wherein:
said arithmetic operation unit has a table storing a process result corresponding to input data; and
said arithmetic operation processing unit searches the table with the input data, and outputs the process result.

17. The data processing device using a table according to claim 16, wherein said arithmetic operation unit divides input data into a plurality of pieces of data, and sequentially searches the table with the plurality of pieces of data.

18. The data processing device using a table according to claim 1, wherein said arithmetic operation unit has
an input FIFO memory unit temporarily storing the input data, and
an output FIFO memory unit temporarily storing a result of the preset process.

19. The data processing device using a table according to claim 18, wherein said arithmetic operation unit performs a data encryption standard operation for the input data within the input FIFO memory, and outputs a result of the operation to the output FIFO memory.

20. The data processing device using a table according to claim 1, wherein
said arithmetic operation unit has a register unit having a plurality of areas corresponding to data structure of the input data; and
said arithmetic operation unit dividing the input data in correspondence with the data structure and stored in corresponding areas among the plurality of areas, and the preset process is performed for contents stored in least one of the areas.

21. The data processing device using a table according to claim 20, wherein the preset process is checking of the data structure of the input data.

22. The data processing device using a table according to claim 20, wherein the preset process is an arithmetic operation performed for contents stored in a particular area among the plurality of areas.

23. The data processing device using a table according to claim 20, wherein the preset process is an extraction of contents stored in a particular area among the plurality of areas.

24. The data processing device using a table according to claim 20, wherein the preset process is a process extracting contents stored in a particular area among the plurality of areas, and obtaining a characteristic of the input data from the extracted contents.

25. The data processing device using a table according to claim 1, wherein said arithmetic operation unit obtains from the input data memory search data with which a memory storing data required for an arithmetic operation preformed for the input data is searched.

26. The data processing device using a table according to claim 1, wherein said arithmetic operation unit performs a mask and gather process for extracting a plurality of bits at arbitrary positions within data, and for gathering the extracted bits.

27. A data processing system using a table, which is configured by connecting a plurality of data processing devices in series, each of the plurality of data processing devices comprising:

an input converting unit obtaining memory search data from input data;

a memory searching unit searching, based on the memory search data, a state transition table storing as an entry a state word which designates a preset process, and reading the state word corresponding to the preset process performed for the input data, said input converting unit determining a method of obtaining subsequent memory search data from subsequently input data, based on the state word; and an arithmetic operation unit determining the preset process performed for the input data based on contents of the state word read by said memory searching unit, and performing the preset process.

28. The data processing system using a table according to claim 27 wherein at least some of the plurality of data processing devices are connected in series via a buffer.

29. A data processing system using a table, which is configured by connecting a plurality of data processing devices in parallel, each of the plurality of data processing devices comprising:

an input converting unit obtaining memory search data from input data;

a memory searching unit searching, based on the memory search data, a state transition table storing as an entry a state word which designates a preset process, and reading the state word corresponding to the preset process performed for the input data, said input converting unit determining a method of obtaining subsequent memory search data from subsequently input data, based on the state word; and an arithmetic operation unit determining the preset process performed for the input data based on contents of the state word read by said memory searching unit, and performing the preset process.

30. The data processing system using a table according to claim 29, further comprising a process synchronizing unit generating a synchronization signal from a signal indicating a process state input from at least one of the plurality of data processing devices, and providing the synchronization signal to at least one of the plurality of data processing devices.

31. The data processing system using a table according to claim 29, further comprising a multiplexed input data identifying unit identifying, if a plurality of pieces of input data are provided as multiplexed data, the input data are identified within the multiplexed data with a predetermined method, and inputting the identified data to corresponding data processing devices among the plurality of data processing devices.

32. The data processing device using a table according to claim 31, wherein said multiplexed input data identifying unit identifies the input data within the multiplexed data according to an address of the multiplexed data, and inputs the identified data to corresponding data processing devices.

33. A data processing device, comprising:

an input converting unit converting input data into memory search data;

a memory searching unit searching a memory by using the memory search data and address information, and reading data used by said input converting unit in determining a method of obtaining subsequent memory search data from subsequently input data; and an arithmetic operation unit determining a process performed for the input data based on the data read by said memory searching unit, performing the process, and obtaining the address information from the data read by said memory searching unit.

34. A data processing device, comprising:

an input converting unit converting input data into memory search data;

a memory searching unit searching a memory by using the memory search data, and reading data used by said input converting unit in determining a method of obtaining subsequent memory search data from subsequently input data; and an arithmetic operation unit determining a process performed for the input data based on the data read by said memory searching unit, and performing the process.

35. A data processing device using a table, comprising:

a memory searching unit searching, based on input data, a state transition table storing as an entry a state word which designates a preset process, the state word determining how the state transition table is subsequently searched based on subsequently input data; and an arithmetic operation unit determining the preset process performed for the input data based on contents of the state word read by said memory searching unit, and performing the preset process.

36. A data processing method, comprising:

converting input data into memory search data;

searching, based on the memory search data, a state transition table storing as an entry a state word which designates a preset process, and reading the state word corresponding to preset process performed for the input data, said converting obtaining the memory search data from the input data using a method based on a previously read state word; and determining the preset process performed for the input data based on contents of the state word, and performing the preset process.

37. A data processing method, comprising:

converting input data into memory search data;

searching, based on the memory search data, a state transition table storing data which designates a preset process within an entry;

reading the data corresponding to the preset process performed for the input data, said converting obtaining the memory search data from the input data using a method based on previously read data from the state transition table; and determining the preset process performed for the input data based on contents of the read data, and performing the preset process.

38. A data processing method, comprising:

converting input data into memory search data;

searching a memory by using the memory search data and address information;

reading data from the memory;

determining a process performed on the input data based on the data read from the memory;

performing the process;

obtaining the address information for subsequent searching based on the data read from the memory; and determining a method for obtaining subsequent memory search data from subsequently input data, based on the data read from the memory.

39. A data processing method, comprising:

converting input data into memory search data;

searching a memory by using the memory search data;

reading from the memory data used by said converting to obtain subsequent memory search data from subsequently input data;

determining a process performed for the input data based on the data read from the memory; and performing the process.

\* \* \* \* \*